(12) United States Patent
Wu et al.

(10) Patent No.: US 12,496,355 B2
(45) Date of Patent: Dec. 16, 2025

(54) METHOD FOR TREATING A CANCER AND/OR CANCER METASTASIS

(71) Applicant: NANO TARGETING & THERAPY BIOPHARMA INC., Taipei (TW)

(72) Inventors: Cheng-Hsun Wu, Hsinchu County (TW); Si-Han Wu, Taoyuan (TW); Yi-Ping Chen, Keelung (TW); Rong-Lin Zhang, Pingtung County (TW); Chung-Yuan Mou, Taipei (TW); Yu-Tse Lee, Tainan (TW)

(73) Assignee: NANO TARGETING & THERAPY BIOPHARMA INC., Taipei (TW)

( * ) Notice: Subject to any disclaimer, the term of this patent is extended or adjusted under 35 U.S.C. 154(b) by 199 days.

(21) Appl. No.: 17/979,474

(22) Filed: Nov. 2, 2022

(65) Prior Publication Data

US 2024/0139337 A1   May 2, 2024

(51) Int. Cl.
| | |
|---|---|
| *A61K 47/69* | (2017.01) |
| *A61K 31/4745* | (2006.01) |
| *A61P 1/00* | (2006.01) |
| *A61P 1/18* | (2006.01) |
| *A61P 35/00* | (2006.01) |

(52) U.S. Cl.
CPC ...... *A61K 47/6935* (2017.08); *A61K 31/4745* (2013.01); *A61P 1/00* (2018.01); *A61P 1/18* (2018.01); *A61P 35/00* (2018.01)

(58) Field of Classification Search
CPC ............ A61K 47/6935; A61K 31/4745; A61K 9/5115; A61K 47/6923; A61K 47/6929; A61P 1/00; A61P 1/18; A61P 35/00
See application file for complete search history.

(56) References Cited

U.S. PATENT DOCUMENTS

| | | | |
|---|---|---|---|
| 11,419,826 B2 | 8/2022 | Wu et al. | |
| 2019/0166015 A1 | 5/2019 | Jan et al. | |
| 2020/0163885 A1* | 5/2020 | Won | A61K 31/203 |

FOREIGN PATENT DOCUMENTS

| | | | | |
|---|---|---|---|---|
| EP | 3741362 | * | 11/2020 | ............... A61K 9/51 |
| EP | 3741362 A2 | | 11/2020 | |
| EP | 3766482 A1 | | 1/2021 | |

OTHER PUBLICATIONS

Ananthakrishnan, Revathi, et al., The Forces Behind Cell Movement, Int. J. Biol. Sci. 2007, 3.
Tay, Chor Yong, et al., Nanoparticles Strengthen Intracellular Tension and Retard Cellular Migration, Nano Lett. 2014, 14, 83-88.
Steeg, Patricia S., Targeting Metastasis, Nat Rev Cancer. Apr. 2016 ; 16(4): 201-218.
Apr. 17, 2023 European Search Report issued by the European Patent Office for European Patent Application No. 22205095.
Apr. 17, 2023 Written Opinion issued by the European Patent Office for European Patent Application No. 22205095.7.

* cited by examiner

*Primary Examiner* — Robert A Wax
*Assistant Examiner* — Kimberly Barber
(74) *Attorney, Agent, or Firm* — LADAS & PARRY LLP

(57) ABSTRACT

The present disclosure relates to a method for treating a cancer and/or cancer metastasis in a subject comprising administering to the subject irinotecan loaded in a mesoporous silica nanoparticle. The present disclosure also provides a conjugate comprising an agent loaded in a mesoporous silica nanoparticle (MSN) defining at least one pore and having at least one functional group on a sidewall of the at least one pore.

16 Claims, 10 Drawing Sheets

METHOD FOR TREATING A CANCER AND/OR CANCER METASTASIS

FIELD OF THE INVENTION

The present disclosure relates to a cancer therapy. Particularly, the present disclosure provides a cancer therapy with mesoporous silica nanoparticles (MSNs).

BACKGROUND OF THE INVENTION

Cancer is known as a cell mass composed of undifferentiated cells that proliferate indefinitely, ignoring the necessary conditions in a tissue, and is also called a tumor. Cancer cells with this unlimited proliferation capacity infiltrate the surrounding tissues and, in more severe cases, metastasize to other organs of the body, resulting in severe pain and eventually death.

A few targeted therapeutic agents are recently used for treating specific cancers, but until now, the main methods are surgery, radiation therapy, and chemotherapy using chemotherapeutic agents that inhibit cell proliferation. However, since chemotherapeutic agents are not targeted therapeutic agents, the biggest problems with existing chemotherapeutic agents are side effects due to cytotoxicity and drug resistance, which are the main factors in which the treatment eventually fails despite the initial successful response by the anticancer agent. Therefore, to overcome the limitations of such chemotherapeutic agents, it is necessary to continuously develop targeted therapeutic agents with clear anticancer action mechanisms.

SUMMARY OF THE INVENTION

The subject disclosure thus relates to a method for treating a cancer and/or cancer metastasis in a subject.

Accordingly, the present disclosure provides a method for treating a cancer in a subject and/or treating a subject who has or is at risk for metastasis of the cancer comprising administering to the subject irinotecan (IRI) loaded in a mesoporous silica nanoparticle (MSN) as a conjugate and optionally a pharmaceutically acceptable carrier.

In some embodiments of the disclosure, the cancer is a metastatic cancer. In some embodiments, the cancer is a solid cancer. Examples of the cancer include, but are not limited to, a squamous cell cancer, a lung cancer, a cancer of the peritoneum, a hepatocellular cancer, a gastric or stomach cancer including gastrointestinal cancer, a pancreatic cancer, a glioblastoma, a cervical cancer, an ovarian cancer, a liver cancer, a bladder cancer, a cancer of the urinary tract, a hepatoma, a breast cancer, a colon cancer, a rectal cancer, a colorectal cancer, an endometrial or uterine carcinoma, a salivary gland carcinoma, a kidney or a renal cancer, a prostate cancer, an vulval cancer, a thyroid cancer, a hepatic carcinoma, an anal carcinoma, a penile carcinoma, a melanoma, a multiple myeloma, B-cell lymphoma, a brain cancer, a head and neck cancer, or associated metastases thereof.

In some embodiments, the method is for inhibiting angiogenesis.

In some embodiments, the method is for inhibiting tube formation.

The present disclosure also provides a method for inhibiting focal adhesion turnover and/or cell migration of a cell in a subject in need thereof comprising administering to the subject the MSN or the conjugate and optionally a pharmaceutically acceptable carrier.

In some embodiments, the cell is a cell of a cancer. Examples of the cell include, but are not limited to a cell of a squamous cell cancer, a lung cancer, a cancer of the peritoneum, a hepatocellular cancer, a gastric or stomach cancer including gastrointestinal cancer, a pancreatic cancer, a glioblastoma, a cervical cancer, an ovarian cancer, a liver cancer, a bladder cancer, a cancer of the urinary tract, a hepatoma, a breast cancer, a colon cancer, a rectal cancer, a colorectal cancer, an endometrial or uterine carcinoma, a salivary gland carcinoma, a kidney or a renal cancer, a prostate cancer, an vulval cancer, a thyroid cancer, a hepatic carcinoma, an anal carcinoma, a penile carcinoma, a melanoma, a multiple myeloma, B-cell lymphoma, a brain cancer, a head and neck cancer, or associated metastases thereof.

In some embodiments, the MSN defines at least one pore and has at least one functional group on a sidewall of the at least one pore, wherein a $pK_a$ value of the at least one functional group is less than or equal to 4.5.

In one embodiment, the at least one functional group on the sidewall of the at least one pore is an acidic group. In another embodiment, the at least one functional group comprises a sulfonate, organosulfate, carboxylate, phosphonate, phosphinate, organophosphate, or organophosphite group. In a further embodiment, the at least one functional group is an alkylsulfonate group.

In one embodiment, the molar ratio of the amount of silane to that of silane with the functional group ranges from 60:1 to 5:1, 50:1 to 5:1 40:1 to 5:1, 30:1 to 5:1, 20:1 to 5:1, 10:1 to 5:1, 9:1 to 7:1, 50:1 to 10:1, 40:1 to 20:1, 35:1 to 25:1, or 30:1 to 27:1.

In one embodiment, the MSN further comprises an outer surface modification with an organic molecule, oligomer or polymer and/or a positively charged molecule, oligomer or polymer.

Examples of the organic molecule, oligomer or polymer include, but are not limited to poly(ethylene glycol) (PEG), poly(propylene glycol) (PPG), or PEG-PPG copolymers, or combinations thereof.

Examples of the positively charged molecule, oligomer or polymer include, but are not limited to (N-[3-(trimethoxysilyl)propyl]-N,N,N-trimethylammonium chloride), N-[3-(Trimethoxysilyl)propyl]ethylenediamine, polyethylenimine (PEI); alkoxylsilane-terminated (poly)alkylene(poly) amine, or organo-alkoxysilane with amino group(s), or combinations thereof.

In some embodiments, an average particle size of the MSN is less than 100 nm measured by transmission electron microscope (TEM), while in another aspect, an average hydrodynamic diameter of MSN is less than 100 nm measured in a PBS medium by dynamic light scattering (DLS).

In some embodiments, zeta potential of the MSN ranges from −30 mV to +30 mV.

The present disclosure also provides a conjugate comprising an agent loaded in a mesoporous silica nanoparticle defining at least one pore and having at least one functional group on a sidewall of the at least one pore, wherein a $pK_a$ value of the at least one functional group is less than or equal to 4.5.

In some embodiments of the disclosure, the agent is loaded in the at least one pore In some embodiments of the disclosure, a $pK_a$ value of the agent is similar to or higher than that of any one of the functional groups of the MSN and/or the agent exhibits changes of properties (such as active/inactive forms conversion, charged status, etc.) at a pH value similar to or higher than the pKa value of any one of the functional groups of the MSN.

In some embodiments of the disclosure, the agent is positively charged and/or exhibits an active form at a pH value similar to or higher than the pKa value of any one of the functional group on the sidewall of the at least one pore of the MSN. Examples of the agent include but are not limited to irinotecan (IRI), amantadine, atenolol, amiodarone, axitinib, barbital, clindamycin, clozapine, chlorambucil, camptothecin, chloroquine, chlorpromazine, clomiphene, cetirizine, doxorubicin, daunorubicin, diphenoxylate, epirubicin, ephedrine, epinephrine, ethionamide, etoposide, 5-fluorouracil, idarubicin, lidocaine, mitoxantrone, mechlorethamine, papaverine, propranolol, promethazine, quinacrine, ranitidine, sertraline, sunitinib, topotecan, trimipramine, toremifene, terconazole, triparanol, vincristine, vinblastine, or venlafaxine.

The subject disclosure also relates to a method for preparing the MSN disclosed herein, comprising the following steps:
(a) providing an alkaline solution containing a surfactant at a concentration sufficient for forming micelles;
(b) introducing a silane source and a pore sidewall functioning silane source into the alkaline solution; wherein the pore sidewall functioning silane source comprises a functional group or a precursor group of said functional group, and a pKa value of the functional group is less than or equal to 4.5; and
(c) conducting hydrothermal treatment on the alkaline solution in step (b) to obtain the MSN.

In some embodiments, the silane source and pore sidewall functioning silane source in step (b) are introduced sequentially or simultaneously.

In some embodiments, the method further comprises introducing a second silane source to the alkaline solution in step (b).

In some embodiments, the method further comprises conducting a surface modification of an outer surface of the MSNs. In some embodiments of the disclosure, the surface modification is conducted after step (b), or after the step of introducing the second silane source to the alkaline solution in step (b).

In some embodiments, the method further comprises removing the surfactant from the alkaline solution in step (c).

In some embodiments, the method further comprises purifying or cleaning the MSN.

In one embodiment, the functional group is an alkylsulfonate group.

In one embodiment, the precursor group of said functional group is an alkylthiol group.

In one embodiment, the molar ratio of the used amount of the silane source to that of the pore sidewall functioning silane source in steps (b) ranges from 60:1 to 5:1, 50:1 to 5:1 40:1 to 5:1, 30:1 to 5:1, 20:1 to 5:1, 10:1 to 5:1, 9:1 to 7:1, 50:1 to 10:1, 40:1 to 20:1, 35:1 to 25:1, or 30:1 to 27:1.

The present disclosure provides a method for treating a disease and/or increasing survival time in a subject in need thereof comprising administering to the subject the conjugate and optionally a pharmaceutically acceptable carrier.

The present disclosure also provides a method for inhibiting angiogenesis in a subject in need thereof comprising administering to the subject the conjugate and optional pharmaceutically acceptable carrier.

DETAILED DESCRIPTION OF THE INVENTION

Figure 1:
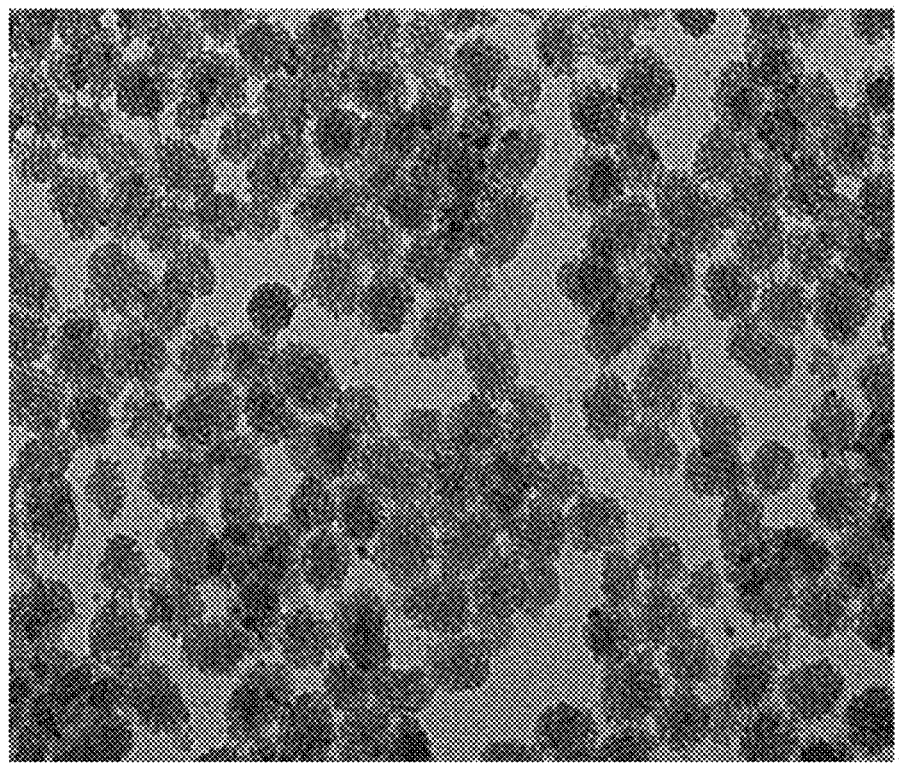
FIG. 1 shows the TEM images of 30 nm $(SO_3^-)$-MSN (NTT2_186k).

In order to facilitate the understanding of the disclosure herein, terms as used herein are hereby defined.

"Optional" or "optionally" means that the subsequently described event or circumstance may or may not occur, and that the description includes instances where said event or circumstance occurs and instances where it does not. For example, the phrase "optionally comprising an agent" means that the agent may or may not exist.

In the context of the specification and the claims, the singular forms "a", "an" and "the" include plural referents, unless specifically indicated otherwise. Unless otherwise stated, any and all examples or exemplary language (e.g., "such as") provided herein are merely used for better illustration of the present invention, instead of limiting the scope of the present invention.

It is to be understood that any numerical range recited in this specification is intended to include all sub-ranges encompassed therein. For example, a range from "50 to 70° C." includes all sub-ranges and specific values between the stated minimum value of 50° C. and the stated maximum value of 70° C., inclusive, e.g. from 58° C. to 67° C., and from 53° C. to 62° C., 60° C. or 68° C. Since the numerical ranges disclosed are continuous, they contain each numerical value between the minimum and maximum value. Unless otherwise specified, the various numerical ranges indicated in this specification are approximate.

The terms "treatment," "treating," and "treat" generally refer to obtaining a desired pharmacological and/or physiological effect. The effect may be preventive in terms of completely or partially preventing a disease, disorder, or symptom thereof, and may be therapeutic in terms of a partial or complete cure for a disease, disorder, and/or symptoms attributed thereto. "Treatment" used herein covers any treatment of a disease in a mammal, preferably a human, and includes (1) suppressing development of a disease, disorder, or symptom thereof in a subject or (2) relieving or ameliorating the disease, disorder, or symptom thereof in a subject.

In the present disclosure, the term "therapeutic agent" or "agent" as used herein refers to substance having a therapeutic effect in an organism. Examples of the therapeutic ingredient include, but are not limited to, a small molecule drug, a peptide, an enzyme, a protein drug, an antibody, a vaccine, an antibiotic or a nucleotide drug.

As used herein, the term "subject" is any animal that can benefit from the administration of a compound or composition as disclosed herein. In some embodiments, the subject is a mammal, for example, a human, a primate, a dog, a cat, a horse, a cow, a pig, a rodent, such as for example a rat or mouse. Typically, the mammal is a human.

The term "effective amount" of an active ingredient as provided herein means a sufficient amount of the ingredient to provide the desired regulation of a desired function. As will be pointed out below, the exact amount required will vary from subject to subject, depending on the disease state, physical conditions, age, sex, species and weight of the subject, the specific identity and formulation of the composition, etc. Dosage regimens may be adjusted to induce the optimum therapeutic response. For example, several divided doses may be administered daily or the dose may be proportionally reduced as indicated by the exigencies of the therapeutic situation. Thus, it is not possible to specify an exact "effective amount." However, an appropriate effective amount can be determined by one of ordinary skill in the art using only routine experimentation.

The term "pharmaceutically acceptable" as used herein refers to compounds, materials, compositions, and/or dosage forms which are, within the scope of sound medical judgment, suitable for use in contact with the tissues of a subject (either a human or non-human animal) without excessive toxicity, irritation, allergic response, or other problem or complication, commensurate with a reasonable benefit/risk ratio. Each carrier, excipient, etc. must also be "acceptable" in the sense of being compatible with the other ingredients of the formulation. Suitable carriers, excipients, etc. can be found in standard pharmaceutical texts.

In the present disclosure, unless particularly specified, the prefix "nano-" as used herein means a size of about 300 nm or less. Unless particularly specified, the prefix "meso-" as used herein, means a size of no greater than about 50 nm.

In the present disclosure, the term "silane" as used herein refers to derivatives of $SiH_4$. Normally, at least one of the four hydrogens is replaced with substituents such as alkyl, alkoxyl, amino, etc. as described below. The term "alkoxysilane" as used herein refers to a silane having at least one alkoxyl substituent directly bonded to the silicon atom. The term "organo-alkoxysilane" as used herein refers to a silane having at least one alkoxyl substituent and at least one hydrocarbyl substituent directly bonded to the silicon atom. The term "silicate source" as used herein refers to substances which can be deemed as a salt form or an ester form of orthosilicic acid, for example sodium orthosilicate, sodium metasilicate, tetraethyl orthosilicate (tetraethoxysilane, TEOS), tetramethylorthosilicate, tetrapropylorthosilicate. Optionally, the hydrocarbyl substituent can be further substituted or interrupted with a heteroatom.

In the present disclosure, the term "alkyl" refers to a saturated, straight or branched alkyl, which comprises preferably 1-30 carbon atoms, and more preferably 1-20 carbon atoms. Examples of alkyl include, but are not limited to, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, iso-heptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl or the like.

In the present disclosure, the term "alkoxyl" or "alkoxy" as used herein means a group having a formula "—O-alkyl," wherein the definition of the "alkyl" in said formula has the meaning of "alkyl" as stated above.

The term "carrier" or "excipient" as used herein refers to any substance, not itself a therapeutic agent, used as a carrier and/or diluent and/or adjuvant, or vehicle for delivery of a therapeutic agent to a subject or added to a formulation to improve its handling or storage properties or to permit or facilitate formation of a dose unit of the composition into a discrete article such as a liquid solution, a suspension, an emulsion, a granule, an ampoule, an injection, an implant, an insert, an infusion, a kit, an ointment, a lotion, a liniment, a cream, a gel, a spray, a drop, an aerosol, or a combination thereof for topical administration. Suitable carriers or excipients are well known to persons of ordinary skill in the art of manufacturing pharmaceutical formulations or food products. Carriers or excipients can include, by way of illustration and not limitation, buffers, diluents, disintegrants, binding agents, adhesives, wetting agents, polymers, lubricants, glidants, substances added to mask or counteract a disagreeable taste or odor, flavors, dyes, fragrances, and substances added to improve appearance of the composition. Acceptable carriers or excipients include citrate buffer, phosphate buffer, acetate buffer, bicarbonate buffer, stearic acid, magnesium stearate, magnesium oxide, sodium and calcium salts of phosphoric and sulfuric acids, magnesium carbonate, talc, gelatin, acacia gum, sodium alginate, pectin, dextrin, mannitol, sorbitol, lactose, sucrose, starches, gelatin, cellulosic materials (such as cellulose esters of alkanoic acids and cellulose alkyl esters), low melting wax cocoa butter, amino acids, urea, alcohols, ascorbic acid, phospholipids, proteins (for example, serum albumin), ethylenediamine tetraacetic acid (EDTA), dimethyl sulfoxide (DMSO), sodium chloride or other salts, liposomes, mannitol, sorbitol, glycerol or powder, polymers (such as polyvinyl-pyrrolidone, polyvinyl alcohol, and polyethylene glycols), and other pharmaceutically acceptable materials. The carrier should not destroy the pharmacological activity of the therapeutic agent and should be non-toxic when administered in doses sufficient to deliver a therapeutic amount of the agent.

For example, the MSN and loaded agent can be specially formulated for administration in solid or liquid form, including those adapted for the following: (1) oral administration, for example, drenches (aqueous or non-aqueous solutions or suspensions), lozenges, dragees, capsules, pills, tablets (e.g., those targeted for buccal, sublingual, and systemic absorption), boluses, powders, granules, pastes for application to the tongue; (2) parenteral administration, for example, by subcutaneous, intramuscular, intravenous or epidural injection as, for example, a sterile solution or suspension, or sustained-release formulation; (3) topical application, for example, as a cream, lotion, gel, ointment, or a controlled-release patch or spray applied to the skin; (4) intravaginally or intrarectally, for example, as a pessary, cream, suppository or foam; (5) sublingually; (6) ocularly; (7) transdermally; (8) transmucosally; or (9) nasally.

Method for Treating a Cancer and/or Cancer Metastasis

The present disclosure provides a method for treating a cancer in a subject and/or treating a subject who has or is at risk for metastasis of the cancer comprising administering to the subject irinotecan (IRI) loaded in a mesoporous silica nanoparticle (MSN) as a conjugate and optionally a pharmaceutically acceptable carrier.

The present disclosure provides a method for treating a disease and/or increasing survival time in a subject in need thereof comprising administering to the subject the conjugate and, optionally, a pharmaceutically acceptable carrier.

The present disclosure also provides a method for inhibiting angiogenesis in a subject in need thereof comprising administering to the subject the conjugate and, optionally, a pharmaceutically acceptable carrier.

In some embodiments of the disclosure, the disease is a cancer; particularly, the disease is a metastatic cancer. In some embodiments, the disease is a solid cancer. Examples of the disease include, but are not limited to, a squamous cell cancer, a lung cancer, a cancer of the peritoneum, a hepatocellular cancer, a gastric or stomach cancer including gastrointestinal cancer, a pancreatic cancer, a glioblastoma, a cervical cancer, an ovarian cancer, a liver cancer, a bladder cancer, a cancer of the urinary tract, a hepatoma, a breast cancer, a colon cancer, a rectal cancer, a colorectal cancer, an endometrial or uterine carcinoma, a salivary gland carcinoma, a kidney or a renal cancer, a prostate cancer, an vulval cancer, a thyroid cancer, a hepatic carcinoma, an anal carcinoma, a penile carcinoma, a melanoma, a multiple myeloma, B-cell lymphoma, a brain cancer, a head and neck cancer, or associated metastases thereof.

In one embodiment of the disclosure, the MSN and conjugate are effective on treating colorectal cancer, particularly metastatic colorectal cancer. Colorectal cancer (CRC) is the third most commonly diagnosed cancer in men and the second most common cancer in women, and is also the second leading cause of cancer death worldwide. The 5-year survival time ranges from 90% for localized stage CRC (Stage I-III) to 10% for patients with distant metastases (stage IV). Metastases are the main cause of CRC-related mortality. 22% of CRCs are metastatic at initial diagnosis, and about 70% of patients will eventually develop metastatic relapse. Colorectal cancer is prone to metastasize and spread to the neighboring lymph nodes, liver, lung, bone, brain or spinal cord. An effective therapy capable of repressing primary colorectal tumor growth and also metastasis is sorely needed.

Cancer cells metastasize to brain is another issue, which might result in high mortality rate. Once a tumor has metastasized into the brain, surgery and radiation therapy neither of treatments are especially effective, the systemic chemotherapies have limited efficacy because of the BBB. The BBB is a vital physiological barrier in the central nervous system that regulates the movement of ion and molecule from circulating blood into brain and protects the brain from invading pathogens and toxic agent. However, the BBB is also blocking most drugs into brain to treating brain disease. The inventors found that MSNs with specific internal surface modification of pores and surface modification of particle exhibit excellent loading capacity of therapeutic agents, especially for irinotecan, good dispersity in buffer or physiological conditions, and good stability in storage or physiological conditions that can be used for tumor targeting, blood-brain tumor barrier (BBTB) penetration, BBB penetration, brain cancer, and brain metastases treatment. Furthermore, MSN has been exhibited anti-cell migration activity for preventing, inhibiting, or suppressing cancer metastases based on in vitro and in vivo models, and it might lessen the incidences of cancer metastases. The therapeutic agents loaded MSN offer a new approach for treatment of cancers with high propensity of undergoing metastasis.

Mesoporous silica nanoparticles are considered to have great potential as drug delivery systems due to unique physical/chemical properties, such as large pore volume, chemical/thermal stability, high loading capacity, adjustable surface properties, and superior biocompatibility. MSNs provide the combined advantages of both silica and mesoporous materials. The versatility of silica chemistry allows for facile integration with other materials, including metal nanoparticles, fluorescent molecules, and rare-earth elements. Mesoporous materials provide large surface area, high pore volume, and uniform pore size distribution. Combining the aforementioned advantages in both bulk and nanosized materials offers characteristics that can be used in a range of applications.

Irinotecan has been approved for colorectal cancer and pancreatic cancer (First-line therapy in combination with different drugs). Irinotecan is a key chemotherapeutic agent for such cancers but with high incidences of bone marrow and gastrointestinal (GI) toxicity. Furthermore, liposomal irinotecan (Onivyde) has been approved for pancreatic cancer (second-line therapy in combination with different drugs) while liposome does not possess any anti-metastatic effects. The longer circulation time (several days) helps Onivyde accumulate in tumor regions, but likewise might linger in the body which can lead to undesirable side effects. The GI toxicity of Onivyde remains a concern for use in colorectal cancers.

In one embodiment of the disclosure, the conjugate comprising irinotecan in MSN significantly improves anti-cancer efficacy on colorectal cancer. Furthermore, MSN has been shown to deter cancer metastasis based on in vitro and in vivo models, and could lessen the incidence of metastasis in colorectal cancers, which are quite common. The conjugate comprising Irinotecan@MSN offers additional clinical benefits over irinotecan and liposomal irinotecan, especially for cancers with high propensity for undergoing metastasis.

In one embodiment of the disclosure, the conjugate comprising irinotecan in MSN significantly improves anti-cancer efficacy on pancreatic cancer. Anti-cancer efficacy of Irinotecan@NTT_MSN is better than irinotecan alone, with less body weight loss compared to a conventional irinotecan+gemcitabine combination therapy.

In one embodiment of the disclosure, the conjugate comprising irinotecan in MSN is capable of repressing primary tumor growth and metastasis and prolonging the survival time, while irinotecan alone exhibits inefficient tumor inhibition on primary tumor growth and metastasis.

In some embodiments of the disclosure, the MSN alone inhibits tubular forming of epithelial cells of blood vessels, inhibiting angiogenesis around tumors.

The present disclosure also provides a method for inhibiting focal adhesion turnover and/or cell migration of a cell in a subject in need thereof comprising administering to the subject the MSN or the conjugate and optionally a pharmaceutically acceptable carrier. In some embodiments of the disclosure, the MSN inhibits the migration ability of endothelial cells and leads to irregular growth of blood vessels. In some embodiments, the MSNs inhibit phosphorylation of ERK, paxillin (PXN) and FAK proteins, and phosphorylation of these proteins has been shown to be associated with focal adhesion turnover. In some embodiments, the MSNs do not affect the actin and microtubulin cytoskeleton.

In some embodiments, the cell is a cell of a cancer. Examples of the cell include, but are not limited to a cell of a squamous cell cancer, a lung cancer, a cancer of the peritoneum, a hepatocellular cancer, a gastric or stomach cancer including gastrointestinal cancer, a pancreatic cancer, a glioblastoma, a cervical cancer, an ovarian cancer, a liver cancer, a bladder cancer, a cancer of the urinary tract, a hepatoma, a breast cancer, a colon cancer, a rectal cancer, a colorectal cancer, an endometrial or uterine carcinoma, a salivary gland carcinoma, a kidney or a renal cancer, a prostate cancer, a vulval cancer, a thyroid cancer, a hepatic carcinoma, an anal carcinoma, a penile carcinoma, a melanoma, a multiple myeloma, B-cell lymphoma, a brain cancer, a head and neck cancer, or associated metastases thereof.

Mesoporous Silica Nanoparticles with Functional Groups on Pore Surface

MSNs can be used as carriers for delivering agents. Normally, the surface of silica nanoparticles may bear negative charge, due to the dissociation of hydrogen from the —SiOH group. A skilled person in the art may thus consider loading an agent having positive charge to the MSNs being available due to the electrostatic interaction. Nevertheless, the surface charge of MSNs is considered slightly negatively charged at most circumstances. Without being bound to the theory, it is believed that the silanol groups on silica nanoparticles may have pKa values of around 4.5 to 5.5 or 8.5 to 9.9, which means that MSNs present in neutral or weak acidic environment would only have few negative charge on the surface. That is, if an agent to be loaded to the MSNs, for example, exhibits a $pK_a$ value similar to or lower than that of the silanol groups on the MSNs, or exhibits changes of properties (such as active/inactive forms conversion, charged status, etc.), it may be difficult to efficiently load said agent due to the low or repulsive electrostatic interaction. Hence, modifying or optimizing the surface characteristics may be necessary for MSN. In addition, it would be preferred to load the agent into the pore instead of on the "outer" surface of the particle, which may avoid may potential problems such as easier drug leakage from particles, particle aggregation or influence of the behavior of MSNs in vivo.

To arrive at these goals, functional groups are introduced onto the surface, in particular the sidewall of pore, of MSNs, wherein the functional groups have a $pK_a$ value less than or equal to 4.5, such that the (pore) surface of MSNs may bear enough negative charge at a lower pH value, e.g., lower than 7, 6 or 5.5. Here, the subject disclosure provides a mesoporous silica nanoparticle defining at least one pore and having at least one functional group on a sidewall of the at least one pore, wherein a $pK_a$ value of the at least one functional group is less than or equal to 4.5.

In one embodiment, the functional group may be an acidic group, such as sulfonate, organosulfate, carboxylate, phosphonate, phosphinate, organophosphate, or organophosphite. In one embodiment, the precursor group can be converted to the functional group and may be thiol, sultone, acyl chlorides, nitriles, anhydrides, amides and carboxylic esters, phosphorus oxychloride, phosphorus trichloride.

In one embodiment, the molar ratio of the amount of silane to that of silane with the functional group ranges from 60:1 to 5:1, 50:1 to 5:1 40:1 to 5:1, 30:1 to 5:1, 20:1 to 5:1, 10:1 to 5:1, 9:1 to 7:1, 50:1 to 10:1, 40:1 to 20:1, 35:1 to 25:1, or 30:1 to 27:1.

In one embodiment, the MSN further comprises an outer surface modification with an organic molecule, oligomer or polymer and/or a positively charged molecule, oligomer or polymer.

Examples of the organic molecule, oligomer or polymer include, but are not limited to poly(ethylene glycol) (PEG), poly(propylene glycol) (PPG), or PEG-PPG copolymers, or combinations thereof.

Examples of the positively charged molecule, oligomer or polymer include, but are not limited to (N-[3-(trimethoxysilyl)propyl]-N,N,N-trimethylammonium chloride), N-[3-(Trimethoxysilyl)propyl]ethylenediamine, polyethylenimine (PEI); alkoxylsilane-terminated (poly)alkylene(poly) amine, or organo-alkoxysilane with amino group(s), or combinations thereof.

Characteristics of MSNs

In the present disclosure, MSNs preferably have an average diameter (particle size) less than 100 nm, measured by transmission electron microscope (TEM). In one embodiment, the mesoporous silica nanoparticle of the present disclosure has an average particle size of 100 nm or less, 80 nm or less, 65 nm or less, 50 nm or less, 40 nm or less, 30 nm or less, 20 nm or less, measured by TEM. In one embodiment, the mesoporous silica nanoparticle of the present disclosure have a pore size of 20 nm or less, 10 nm or less, 5 nm or less, 3 nm or less, or 2 nm or less. In one embodiment, the mesoporous silica nanoparticle of the present disclosure has an average hydrodynamic diameter of 100 nm or less, 80 nm or less, 60 nm or less, 50 nm or less, 40 nm or less, 30 nm or less measured in phosphate buffered saline (PBS) by dynamic light scattering.

In certain embodiments, the zeta potential (in pH 7.4 condition) of the MSNs may range from −30 to +30 mV, −28 to +25 mV, −23 to +22 mV, −20 to +20 mV, −15 to +15 mV, or −10 to +10 mV, or a reasonable numeric range within the endpoints mentioned herein, for example −15 to +20 mV, −10 to +25 mV, −15 to +10 mV, etc. In one embodiment, the mesoporous silica nanoparticle has a BET surface area of 1000 $m^2/g$ or less, 750 $m^2/g$ or less, or 500 $m^2/g$ or less.

Method of Preparing Pore-Modified MSNs

In one aspect, MSNs can be prepared by the following steps: (a) providing an alkaline solution containing a surfactant at a concentration sufficient for forming micelles; (b-1) introducing a silane source into the alkaline solution and a pore sidewall functioning silane source having the desired functional group or precursor group thereof (hereinafter referred to as "pore sidewall functioning silane") one after the other into the alkaline solution, or (b-2) introducing a silane source and a pore sidewall functioning silane into the solution; optionally introducing a second silane source and introducing an outer surface modifying agent; and (c) conducting hydrothermal treatment on the alkaline solution; optionally collecting the products; optionally removing the residual surfactant from the products; and optionally purifying or cleaning the products.

In one embodiment, 0.2 to 0.5 g of a surfactant is dissolved in 100 to 250 mL of an aqueous, alkaline solution (e.g., ammonium hydroxide solution (0.05 to 1.2M)) at the desired temperature (e.g., 45 to 65° C.) in a sealed beaker. After 10 to 30 minutes of stirring, 200 to 550 μL silane source and 10 to 100 μL internal surface functioning silane in 300 to 2500 μL of a solvent (e.g., alcohol, such as ethanol) is added and stirred for 30 to 120 minutes. After that, an additional 50 to 200 μL silane source in 0.6 to 2 mL of a solvent (e.g., alcohols, such as ethanol) is introduced and stirred for 1.5 to 3 hours. Surface modification agents, e.g., 650 to 1700 μL PEG-silane and optionally 30 to 1000 μL silane having positively charged groups in 2 to 6 mL of a solvent (e.g., alcohol, such as ethanol) are introduced and stirred for 0.5 to 1.5 hours. The mixture is aged at a desired temperature (e.g., 40 to 80° C.) with or without stirring for at least 15 hours. Finally, the solution is sealed and placed in an oven at 60 to 100° C. for 12 to 48 hours of hydrothermal treatment. The as-synthesized product is washed and collected by centrifugation or crossflow. The as-synthesized product is finally treated for removal of the surfactant and purification, and washed and harvested by centrifugation or crossflow. If a silane source having a precursor group of the desired functional group, further treatment such as oxidation or hydrolysisis conducted to convert the precursor group to the desired functional group, optionally including further purification. The final product is then stored, preferably in water, or 85% or higher ethanol.

Examples of surfactants suitable for use in step (a) include, but are not limited to, cationic surfactants, anionic surfactants and non-ionic surfactants. Proper surfactants are selected based on the conditions of reaction, such as pH value, ionic strength, temperature, reactants and products, etc. Examples of cationic surfactants include, but are not limited to, pH-dependent primary, secondary, or tertiary amines with a long-chain hydrocarbyl group, wherein the terminal amine group bears positive charge when presenting less than a specific pH value, such as primary and secondary amines becoming positively charged at pH<10, for example octenidine dihydrochloride, and permanently charged quaternary ammonium salts, e.g., cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB). Examples of anionic surfactants include, but are not limited to, sulfate, sulfonate, and phosphate salts or esters, such as ammonium lauryl sulfate, sodium lauryl sulfate (sodium dodecyl sulfate, SLS, or SDS), and the related alkyl-ether sulfates, sodium laureth sulfate (sodium lauryl ether sulfate or SLES), and sodium myreth sulfate, docusate (dioctyl sodium sulfosuccinate), perfluorooctanesulfonate (PFOS), perfluorobutanesulfonate, alkyl-aryl ether phosphates, alkyl ether phosphates, etc. Examples of non-ionic surfactants include, but are not limited to, poly(oxyethylene)nonylphenyl ether, polyoxyethylene glycol sorbitan alkyl ester, polyethylene glycol alkyl ether, glucoside alkyl ether, polyethylene glycol octylphenyl ether, polyethylene glycol alkylphenyl ether, glycerol alkyl ester, polypropylene glycol alkyl ethers, block copolymers, poloxamers, cocamide MEA, cocamide DEA, lauryldimethylamine oxide or polyethoxylated tallow amine.

In one embodiment, the silane source used in step (b-1), (b-2) comprises tetraethoxysilane (TEOS), tetramethoxysilane (TMOS), sodium silicate or a mixture thereof.

In one embodiment, the pore sidewall functioning silane can be used in step (b-1) or (b-2). Examples of said pore sidewall functioning silane include, but are not limited to, (mercaptoalkyl)trialkoxysilane, e.g., (3-mercaptopropyl) trimethoxysilane (MPTMS), (3-mercaptopropyl)triethoxysilane, (11-mercaptoundecyl)trimethoxysilane (trihydroxysilyl)alkane sulfonic acid, e.g., 3-(trihydroxysilyl)propane-1-sulfonic acid (TPS), 3-(trihydroxysilyl) propyl methylphosphonate, (3-triethoxysilyl)propylsuccinic anhydride, bis(3-triethoxysilylpropyl)carbobate, carboxyethylsilanetriol, 2-(4.chlorosulfonylphenyl)ethyltrimethoxysilane, triethoxysilylpropylmaleamic acid, N-(trimethoxysilylpropyl)ethylenediaminetriacetate, diethylphosphatoethyltriethoxysilane.

In one embodiment, the surface modifying agents can be used for adjusting the properties of MSNs. In one embodiment, the (organic) modifying agent(s) include, but are not limited to, propyl triethoxysilane, butyl trimethoxysilane, octyltrimethoxysilane, diphenyl diethoxysilane, n-octyltriethoxysilane, chloro methyl trimethoxysilane, isobutyl triethoxysilane, ethyl trimethoxy styrene silane, methyl triethoxysilane, phenyltriethoxysilane (PTEOS), phenyltrimethoxysilane (PTMOS), methyltrimethoxysilane (MTMOS), ethyltriacetoxysilane (ETAS), N-(trimethoxysilylpropyl)ethylenediaminetriacetic acid (EDTAS), (3-trihydroxysilyl)propyl methylphosphonate (THPMP), methyltriacetoxysilane (MTAS), zwitterionic silane, (N-[3-(trimethoxysilyl)propyl]-N,N,N-trimethylammonium chloride), N-[3-(Trimethoxysilyl)propyl]ethylenediamine, polyethylenimine (PEI); alkoxylsilane-terminated (poly)alkylene(poly)amine, or organo-alkoxysilane with amino group(s), etc.

In one embodiment, the molar ratio of the silane source (in total, i.e., used in step (b-1)/(b-2) to the pore sidewall functioning silane may range from 60:1 to 5:1, 50:1 to 5:1 40:1 to 5:1, 30:1 to 5:1, 20:1 to 5:1, 10:1 to 5:1, 9:1 to 7:1, 50:1 to 10:1, 40:1 to 20:1, 35:1 to 25:1, or 30:1 to 27:1, or any reasonable numeric range consisting of the endpoints.

Conjugate Containing Agents Loaded on Pore-Modified MSNs

The inventors inferred that, with certain pore sidewall modifications, MSNs may have the potential to provide the desired pharmacological effect as well as superior loading efficacy or stability regarding the agent which exhibits a $pK_a$ value similar to or higher than that of any one of the functional groups of the MSNs, and/or exhibits changes of properties (such as active/inactive forms conversion, charged status, etc.) at a pH value similar to or higher than the pKa value of any one of the functional groups of the MSN. In addition, the agents is positively charged and/or exhibits an active form at a pH value similar to or higher than the pKa value of any one of the functional group on the sidewall of the at least one pore of the MSN.

One specific example of the agents is irinotecan (IRI). In particular, IRI would be in the lactone form (which is considered therapeutically active) in an acidic environment, in particular pH<5.5, and in the carboxylate form (which is considered inactive) at slightly acidic, neutral, or basic environments, in particular pH>6. Hence, IRI should be loaded in the active form, i.e., at acidic environment, but the dissociation level of silanol groups on MSNs may not provide sufficient attraction to IRI, which leads to poor loading efficacy and/or long-term stability of IRI. Examples of these agents include, but are not limited to, amantadine, atenolol, amiodarone, axitinib, barbital, clindamycin, clozapine, chlorambucil, camptothecin, chloroquine, chlorpromazine, clomiphene, cetirizine, doxorubicin, daunorubicin, diphenoxylate, epirubicin, ephedrine, epinephrine, ethionamide, etoposide, 5-fluorouracil, idarubicin, lidocaine, mitoxantrone, mechlorethamine, papaverine, propranolol, promethazine, quinacrine, ranitidine, sertraline, sunitinib, topotecan, trimipramine, toremifene, terconazole, triparanol, vincristine, vinblastine, or venlafaxine.

In one embodiment, the agent is loaded into the nanoparticles. Encapsulation of the agent in the MSN does not significantly affect the dispersity and hydrodynamic size in a medium such as a medium being biologically similar to or equivalent to phosphate buffered saline (PBS).

For the treatment of disease, additional bioactive ingredient can be loaded onto and/or into MSNs, for example distributed within the space in MSNs, on the surface of MSNs, etc. The bioactive ingredient may be properly selected based on the size thereof and the concerned disorders/diseases. Examples of the bioactive ingredient include, but are not limited to, everolimus, trabectedin, abraxane, TLK 286, AV-299, DN-I01, pazopanib, GSK690693, RTA 744, ON 0910.Na, AZD 6244 (ARRY-142886), AMN-107, TKI-258, GSK461364, AZD 1152, enzastaurin, vandetanib, ARQ-197, MK-0457, MLN8054, PHA-739358, R-763, AT-9263, a FLT-3 inhibitor, a VEGFR inhibitor, an EGFR TK inhibitor, an aurora kinase inhibitor, a PIK-1 modulator, a Bcl-2 inhibitor, an HDAC inhibitor, a c-MET inhibitor, a PARP inhibitor, a Cdk inhibitor, an EGFR TK inhibitor, an IGFR-TK inhibitor, an anti-HGF antibody, a PI3 kinase inhibitors, an AKT inhibitor, a JAK/STAT inhibitor, a checkpoint-1 or 2 inhibitor, a focal adhesion kinase inhibitor, a Map kinase kinase (mek) inhibitor, a VEGF trapantibody, pemetrexed, erlotinib, dasatanib, nilotinib, decatanib, panitumumab, amrubicin, oregovomab, Lep-etu, nolatrexed, azd2171, batabulin, ofatumumab, zanolimumab, edotecarin, tetrandrine, rubitecan, tesmilifene, oblimersen, ticilimumab, ipilimumab, gossypol, Bio 111, 131-I-TM-601, ALT-110, BIO 140, CC 8490, cilengitide, gimatecan, IL13-PE38QQR, INO 1001, IPdR1 KRX-0402, lucanthone, LY317615, neuradiab, vitespan, Rta 744, Sdx 102, talampanel, atrasentan, Xr 311, romidepsin, ADS-I00380, sunitinib, 5-fluorouracil, vorinostat, etoposide, gemcitabine, doxorubicin, liposomal, 5'-deoxy-5-fluorouridine, vincristine, temozolomide, ZK-304709, seliciclib; PD0325901, AZD-6244, capecitabine, L-Glutamic acid, N-[4-[2-(2-amino-4,7-dihydro-4-oxo-1-H-pyrrolo[2,3-d]pyrimidin-5-yl)ethyl]benzoyl]-disodium salt, heptahydrate, camptothecin, PEG-labeled irinotecan, tamoxifen, toremifene citrate, anastrazole, exemestane, letrozole, DES (diethylstilbestrol), estradiol, estrogen, conjugated estrogen, bevacizumab, IMC-1C11, CHIR-258, 3-[5-(methylsulfonylpiperadinemethyl)-indolyl]-quinolone, vatalanib, AG-013736, AVE-0005, goserelin acetate, leuprolide acetate, triptorelinpamoate, medroxyprogesterone acetate, hydroxyprogesterone caproate, megestrol acetate, raloxifene, bicalutamide, flutamide, nilutamide, megestrol acetate, CP-724714; TAK-165, HKI-272, erlotinib, lapatanibcanertinib, ABX-EGF antibody, erbitux, EKB-569, PKI-166, GW-572016, Ionafarnib, BMS-214662, tipifamib; amifostine, NVP-LAQ824, suberoyl analide hydroxamic acid, valproic acid, trichostatin A, FK-228, SU11248, sorafenib, KRN951, aminoglutethimide, amsacrine, anagrelide, L-asparaginase, Bacillus Calmette Guerin (BCG) vaccine, bleomycin, buserelin, busulfan, carboplatin, carmustine, chlorambucil, cisplatin, cladribine, clodronate, cyproterone, cytarabine, dacarbazine, dactinomycin, daunorubicin, diethylstilbestrol, epirubicin, fludarabine, etc., fludrocortisone, fluoxymesterone, flutamide, gemcitabine, hydroxyurea, idarubicin, ifosfamide, imatinib, leuprolide, levamisole, lomustine, mechlorethamine, melphalan, 6-mercaptopurine, mesna, methotrexate, mitomycin, mitotane, mitoxantrone, nilutamide, octreotide, oxaliplatin, pamidronate, pentostatin, plicamycin, porfimer, procarbazine, raltitrexed, rituximab, streptozocin, teniposide, testosterone, thalidomide, thioguanine, thiotepa, tretinoin, vindesine, 13-cis-retinoic acid, phenylalanine mustard, uracilmustard, estramustine, altretamine, floxuridine, 5-deooxyuridine, cytosine arabinoside, 6-mecaptopurine, deoxycoformycin, calcitriol, valrubicin, mithramycin, vinblastine, vinorelbine, topotecan, razoxin, marimastat, COL-3, neovastat, BMS-275291, squalamine, endostatin, SU5416, SU6668, EMD121974, interleukin-12, IM862, angiostatin, vitaxin, droloxifene, idoxyfene, spironolactone, finasteride, cimitidine, trastuzumab, denileukindiftitox, gefitinib, bortezimib, paclitaxel, cremophor-free paclitaxel, epithilone B, BMS-247550, BMS-310705, droloxifene, 4-hydroxytamoxifen, pipendoxifene, ERA-923, arzoxifene, fulvestrant, acolbifene, lasofoxifene, idoxifene, TSE-424, HMR-3339, ZK186619, topotecan, PTK787/ZK 222584, VX-745, PD 184352, rapamycin, 40-O-(2-hydroxyethyl)rapamycin, temsirolimus, AP-23573, RAD001, ABT-578, BC-210, LY294002, LY292223, LY292696, LY293684, LY293646, wortmarmin, ZM336372, L-779,450, PEG-filgrastim, darbepoetin, erythropoietin, granulocytecolony-stimulating factor, zolendronate, prednisone, cetuximab, granulocyte macrophage colony-stimulating factor, histrelin, pegylated interferon alfa-2a, interferon alfa-2a, pegylated interferon alfa-2b, interferon alfa-2b, azacitidine, PEG-L-Asparaginase, lenalidomide, gemtuzumab, hydrocortisone, interleukin-11, dexrazoxane, alemtuzumab, all-transretinoic acid, ketoconazole, interleukin-2, megestrol, immune globulin, nitrogen mustard, methylprednisolone, ibritgumomab-tiuxetan, androgens, decitabine, hexamethylmelamine, bexarotene, tositumomab, arsenic trioxide, cortisone, editronate, mitotane, cyclosporine, liposomal daunorubicin, Edwina-asparaginase, strontium 89, casopitant, netupitant, an NK-1 receptor antagonists, palonosetron, aprepitant, diphenhydramine, hydroxyzine, metoclopramide, lorazepam, alprazolam, haloperidol, droperidol, dronabinol, dexamethasone, methylprednisolone, prochlorperazine, granisetron, ondansetron, dolasetron, tropisetron, pegfilgrastim, erythropoietin, epoetin alfa and darbepoetin alfa, docetaxel, cabazitaxel, curcumin, curcumin analog.

The following examples are provided to make the present invention more comprehensible to those of ordinary skill in the art to which the present invention pertains, but are not intended to limit the scope of the invention.

EXAMPLES

Materials, Methodologies and Test Models
Transmission Electron Microscope (TEM)

Transmission electron microscopy (TEM) is used to directly examine and verify the appearance of the silica nanoparticles. The TEM images were taken on a Hitachi H-7100 transmission electron microscope operated at an accelerated voltage of 100 kV. Samples dispersed in ethanol were dropped on carbon-coated copper grids and dried in air for TEM observation.

Dynamic Light Scattering (DLS) and Zeta Potential

Size measurements of the silica nanoparticles in different solution environments were performed with Dynamic Light Scattering (DLS) on a Malvern Zetasizer Nano ZS (Malvern, UK). The (solvated) particle sizes formed in different solutions were analyzed: $H_2O$ and PBS buffer solution (pH7.4) at room temperature. Surface charge (zeta potential) of the silica nanoparticles in PBS (0.01×, pH 7.4) at particle concentration 0.1 mg/mL were performed by a Malvern Zetasizer Nano ZS.

Elemental Analysis

The mass percentages of carbon, nitrogen, oxygen, sulfur and hydrogen in silica nanoparticle were determined by elemental analyzer (elementar Vario EL cube type for NCSH, German).

Example 1

Preparation of Mesoporous Silica Nanoparticles with Modifications on the Outer Surface of Particle but No Modifications on the Pore Sidewall The MSN was prepared using an ammonia base-catalyzed method under highly diluted and low surfactant conditions. The particle size was controlled by adjusting ammonia concentration, TEOS amount added, and reaction temperature. Typically, 0.29 g of CTAB was dissolved in 150 mL of ammonium hydroxide solution (0.128 M to 0.17 M) at 60° C. in a sealed beaker. After 15 minutes of stirring, the sealed lid was removed, and then 390 µL tetraethoxysilane (TEOS) and 5 µL 3-aminopropyltrimethoxysilane (APTMS) in 4.105 mL of ethanol were added to the solution under vigorous stirring. After 1 hour of stirring, the 550 μL of PEG and 85.7-300 μL of TA (optionally added) in 2 mL of ethanol were introduced into the reaction. After the mixture was stirred for 30 minutes, the mixture was aged at 60° C. without stirring for o/n until the reaction volume declining to 50 mL. Then the solution was filtrated with 0.22 μm filter and placed in an oven at 70° C. for 24 hours of hydrothermal treatment. The as-synthesized sample was washed and collected by crossflow. For removing the surfactant in the pores of the MSNs, the as-synthesized sample was collected in 50 mL of ethanol containing 848 μL of HCl (36.5-38%) for first time of acid extraction for 1 hour and 50 μL of HCl for second time of acid extraction for 1 hour at 60° C. The product was washed and harvested by crossflow and finally stored in H$_2$O or organic solvents. Particle size of MSNs (25 nm and 50 nm) was controlled by adjusting the concentration of TEOS and NH$_4$OH (25 nm MSN: MSN-PEG 25, MSN-PEG/TA 25; 50 nm MSN: MSN-PEG 50, MSN-PEG/TA 50).

Example 2

Preparation of Mesoporous Silica Nanoparticle with Sulfonic Functional Group on the Pore Sidewall, (($SO^{3-}$)-MSNs)

0.2 to 0.5 g of CTAB was dissolved in 100 to 250 mL of an aqueous ammonium hydroxide solution (about 0.05 to 1.2 M) at 45 to 65° C. in a sealed beaker. After 10 to 30 minutes of stirring, 200 to 550 μL tetraethoxysilane (TEOS) and 10 to 100 μL (3-mercaptopropyl)trimethoxysilane (MPTMS) (the molar ratio of TEOS/MPTMS=50:1, 40:1, 25:1, 20:1, 10:1, 8.3:1 and 5:1, the TEOS:MPTMS ratio can be changed to modulate the amount of functional groups of the pore surface for different applications or loaded drugs) in 900-2500 μL of ethanol was added and stirred for 30 to 90 minutes. After that, an additional 50 to 130 μL tetraethoxysilane (TEOS) in 0.8 to 2 mL of ethanol was introduced and stirred for 1.5 to 3 hours. Then, 650 to 1700 μL 2-[methoxy(polyetheyleneoxy)propyl]-trimethoxysilane (PEG-silane) and 100 to 260 μL N-[3-(trimethoxysilyl)propyl]-N,N,N-trimethylammonium chloride (TA-silane) in 2000 to 5400 μL of ethanol) were introduced and stirred for 0.5 to 1.5 hours. Then, the mixture was aged at 40 to 60° C. for at least 15 hours. Finally, the solution was sealed and placed in an oven at 65 to 75° C. for 15 to 24 hours of hydrothermal treatment. The intermediate product was washed and collected by centrifugation or crossflow. The intermediate product was finally treated for removal of the surfactant and purification, washed and harvested by centrifugation or crossflow. To covert the mercapto (thiol) group into sulfonate group, oxidation was conducted by introducing oxidant to the intermediate, and the final product was further purified. The product was stored in water, organic solvent or buffer.

The hydrodynamic diameter of the ($SO_3^-$)-MSNs was measured via Dynamic Light Scattering (DSL) in PBS buffer. DLS results show that all ($SO_3^-$)-MSNs dispersed well within the range from about 30 nm to 50 nm, but dispersity of high sulfonic group-introduced particle (TEOS:MPTMS=5:1) may be influenced (hydrodynamic diameter about 60 nm in water and PBS buffer). The synthesis conditions of NTT2_185 and NTT2_186k are TEOS/MPTMS (8.3:1) and PEG-silane/TA-silane (7:1). Characterization of NTT2_185 and NTT2_186k includes particle size measured by TEM of about 20.6 nm and 25.1 nm; DLS particle size measured in PBS of about 33.5 and 39.7 nm; zeta potential of about −25 mV and −25.3 mV. Characterizations of NTT2_186k is similar to NTT2_185, but the surface modifications and manufacturing process of NTT2_186k was optimized.

Preparation of ($SO_3^-$)-MSNs with Neutral Surface Charge (Zeta Potential)

0.2 to 0.5 g of CTAB was dissolved in 100 to 250 mL of an aqueous ammonium hydroxide solution (about 0.05 to 1.2 M) at 55 to 65° C. in a sealed beaker. After 10 to 30 minutes of stirring, 25 to 70 μL 3-(trihydroxysilyl)propane-1-sulfonic acid (TPS) in 250 to 700 μL water, 200 to 550 μL tetraethoxysilane (TEOS) in 900 to 2500 μL ethanol and an additional 50 to 130 μL tetraethoxysilane (TEOS) in 800 to 2000 μL ethanol was separately introduced, each introduction followed by stirring at 55 to 65° C. for 5 minutes to 2.5 hours. Then, 650 to 1700 μL 2-[methoxy(polyetheyleneoxy)propyl]-trimethoxysilane (PEG-silane) and 30 to 90 μL N-[3-(Trimethoxysilyl)propyl]ethylenediamine (EDPTMS) in 2000 to 5400 μL of ethanol were introduced and stirred for 0.5 to 1.5 hours. Then, the mixture was aged at 45 to 65° C. for at least 15 hours. Finally, the solution was sealed and placed in an oven at 60 to 90° C. for 18 to 30 hours of hydrothermal treatment to give the final product ($SO_3^-$)-MSN, (NTT2_202).

Characterization of NTT2_202 includes particle size measured by TEM of about 28.2 nm; DLS particle size measured in PBS of about 52.9 nm; zeta potential of about +1.41 mV.

Example 3

Irinotecan (IRI) was Load into the MSNs

The 300 mg of MSNs in 16.785 mL of H$_2$O was mixed with 495 μL of NaHCO$_3$ (0.1M, pH 9.96) or acetate buffer (0.1M, pH 5.5). After 5 minutes of shaking at R.T., IRI solution was introduced into the solution for 30 minutes of stirring at R.T. After that, the mixture was washed and purified with NaHCO$_3$ (2.5 mM, pH 8.5) or acetate buffer (2.5 mM, pH 5.5) by Vivaspin or crossflow. Finally, the product was stored in NaHCO$_3$ or acetate buffer.

Irinotecan (IRI) was Load into the ($SO_3^-$)-MSN (NTT2_185 and NTT2_186k)

The 600 mg of particles in 6 mL of acetate buffer (2.5 mM, pH 5.5) mixed with IRI solution for 30 minutes of stirring at R.T. After that, the mixture was washed and purified with acetate buffer by Vivaspin or crossflow. Finally, the product was stored in acetate buffer.

Irinotecan (IRI) was Load into the ($SO_3^-$)-MSN (NTT2_202)

The 150 mg of NTT2_202 in 1.5 mL H$_2$O was mixed with 375 μL NaHCO$_3$ (93 mM, pH 11.5) for alkaline treatment. Then IRI solution was introduced for 10 minutes of stirring at R.T. After that, the mixture was first washed with H$_2$O and then washed with acetate buffer (2.5 mM, pH 5.5) by Vivaspin. Then the IRI@NTT2_202 was immersed in 7.5 mL acetate buffer for at least 15 h at 4° C. After that, the mixture was further washed with acetate buffer and the product was stored in acetate buffer.

The driving force of IRI loading into MSNs or ($SO_3^-$)-MSN is electrostatic interaction. The positively charged IRI adsorbed into the pores of MSNs which have the negatively charged silanol groups or functional groups on the internal surface of pores. Irinotecan (pka about 10.9) was positively charged at the environmental pH less than 10.9 and the conformation of IRI changed depending on the pH. IRI would be in the lactone form (which is considered therapeutically active) in an acidic environment (pH<5.5), and in the carboxylate form (which is considered inactive form) at slightly acidic, neutral, or basic environments (pH>6).

According to the properties of IRI, the appropriate condition of the IRI loading process was at the pH of 5.5 or less, which could make IRI be positively charged and in active form. Different loading strategies were tested for the MSNs, NTT2_186k, and NTT2_202. Loading IRI into MSNs at the acid condition (pH<5.5) exhibited poor loading capacity (3.93%) and efficiency (33%), and poor long-term stability of IRI@MSN. The reason is that silanol groups on the internal surface of pores presented weak negative charges at the acid condition, resulting in poor electrostatic interaction between IRI and silanol groups on the pore sidewall. Performed the IRI loading process at the alkaline condition to enhance the negatively charged in the pores of MSN that could improve loading capacity to 10%-15%. However, the lactone form ratio of IRI in IRI@MSNs was about 63% and continually decreased by the storage time. In contrast, $(SO_3^-)$-MSN had sulfonic functional groups (pka~−7) on the pore sidewall, which could exhibit strong negatively charged even at the acid condition. The IRI loading capacity (11.43%) and efficiency (>80%) of NTT2_186k were much higher than MSNs without sulfonic functional groups on the internal surface of pores. More importantly, almost all of IRI molecules were in lactone form (>99%). Another $(SO_3^-)$-MSN (NTT2_202) with EDPTMS modified on the surface of particle exhibited neutral zeta potential. For loading IRI into NTT2_202, the loading process is slightly adjusted. First, NTT2_202 particles were treated with alkaline $NaHCO_3$ buffer to deprotonate amine groups on the surface of NTT2_202 for diminishing the electrostatic repulsion between positively charged amine groups and IRI. IRI molecules could be loaded into pores via electrostatic interaction between negatively charged sulfonic groups on the sidewall of pores and positively charged IRI. After the loading process, IRI@NTT2_202 was washed with acetate buffer and stored in the acid condition for long-term storage. The lactone form ratio of IRI in IRI@NTT2_202 could achieve about 96% or higher. Although the loading capacity of NTT2_202 is lower than NTT2_186k, NTT2_202 offered an approach to synthesize IRI@MSN particles with neutral surface charge (zeta potential), and the particle still can exhibit good loading capacity, efficiency, and lactone form ratio of IRI. In conclusion, sulfonic functional groups (functional groups with pka ≤4.5) were modified on the internal surface of pores of MSNs, which was important for loading IRI into MSNs, especially for the loading process performed at acid conditions. Characterization of MSNs loaded with IRI is shown in Table 1.

TABLE 1

| Characteristics | IRI@MSN (no modifications on pore sidewall) | IRI@NTT2_186k | IRI@ NTT2_202 |
| --- | --- | --- | --- |
| DLS (d, nm) in PBS | 42.5 nm | 39.7 nm | 52.9 nm |
| zeta potential | −9.7 mV | −25.3 mV | 1.41 mV |
| loading capacity | 3.93 | 11.43% | 5.16% |
| loading efficiency | 33% | >80% | >80% |

Example 4

Irinotecan in MSN Nanoformulation for Pancreatic Cancer Therapy

Figure 2:
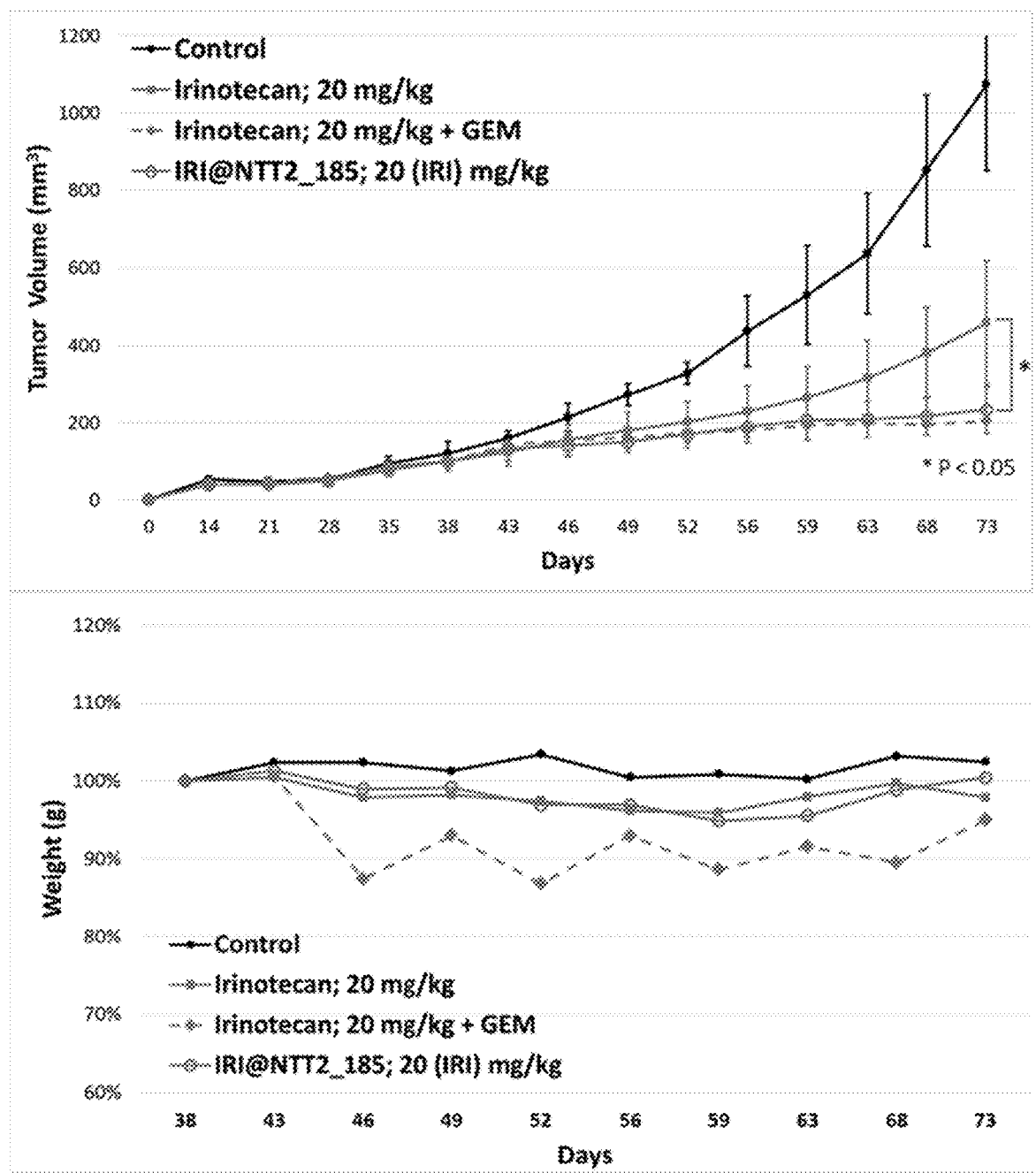
FIG. 2 shows the anti-pancreatic cancer efficacy and toxicity of irinotecan, irinotecan@$(SO_3^-)$-MSN (IRI@NTT2_185), and co-treatment of irinotecan and gemcitabine.

To evaluate the efficacy of IRI@$(SO_3^-)$-MSN anti-pancreatic tumor in vivo, $5\times10^6$ PANC-1 cells, human pancreatic cancer cells, were implanted subcutaneously on the left flank of NOD-SCID mice to serve as the PANC-1 xenograft mouse model. The first injection started when the tumor volume reached 100 $mm^3$. Tumor-bearing mice received irinotecan (IRI), co-treatment with IRI and gemcitabine GEM (an approved drug for the pancreatic treatment), and IRI@NTT2_185 at 20 mg IRI/kg once per week for a total of 4 administration. Tumor size and body weight were observed over the study period. Results indicated that the efficacy of IRI@NTT2_185 and (IRI+GEM) combination therapy on tumor growth inhibition is better than IRI. Although the anti-cancer efficacy of IRI@NTT2_185 was similar to IRI+GEM, IRI@NTT2_185 exhibited less toxicity (lower body weight loss) compared to (IRI+GEM) combination therapy (FIG. 2). The anti-pancreatic cancer efficacy of IRI@$(SO_3^-)$-MSN was also evaluated in another subcutaneous allograft tumor model. $2\times10^6$ KPC cells were implanted subcutaneously on the left flank of B6 mice. The first injection started when the tumor volume reached 100 $mm^3$. Tumor-bearing mice received IRI and IRI@$(SO_3^-)$-MSN at 20 mg/kg twice per week for a total of 4 administrations. IRI@$(SO_3^-)$-MSN exhibited significant tumor growth inhibition in comparison to the IRI group. Furthermore, IRI@$(SO_3^-)$-MSN exhibited dose-related anti-cancer efficacy. In conclusion, irinotecan in MSN nanoformulation possessed better tumor-targeting capability (based on the EPR effect of MSN) led to diminished drug-related toxicities and improved tumor inhibition. MSN nanoformulation of IRI offered a potential treatment for the unmet medical needs on pancreatic cancer treatment.

Example 5

Irinotecan in MSN Nanoformulation for Colorectal Cancer Therapy

Figure 3:
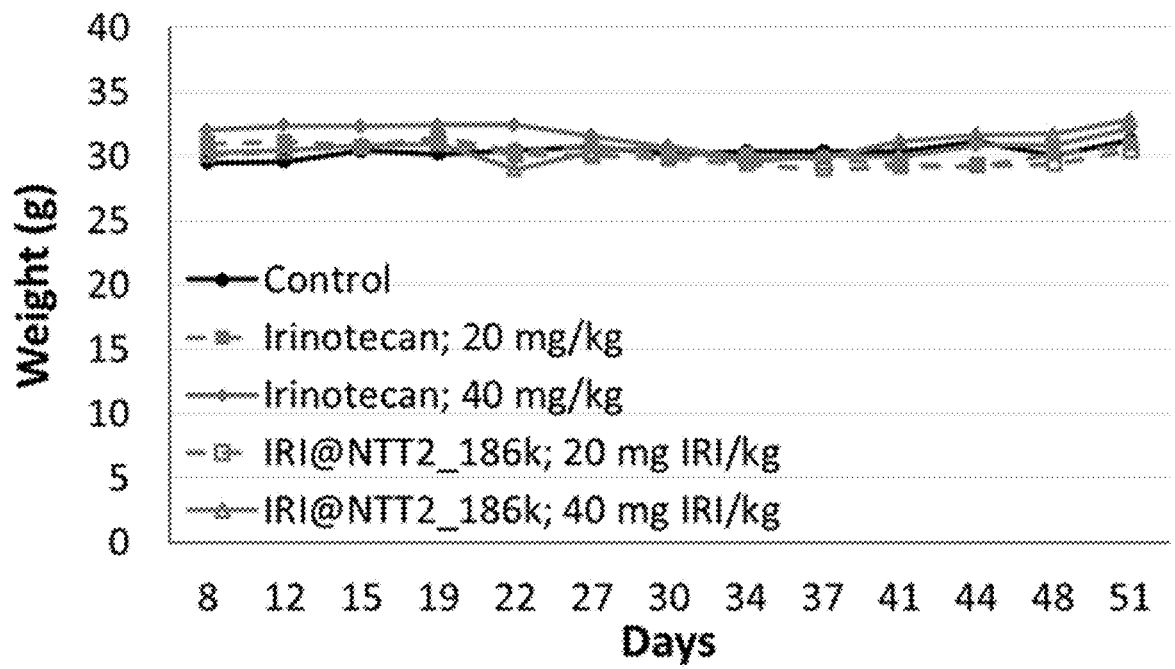
FIG. 3 shows the anti-colorectal cancer efficacy of irinotecan and irinotecan@$(SO_3^-)$-MSN (IRI@NTT2_186k).
Figure 3:
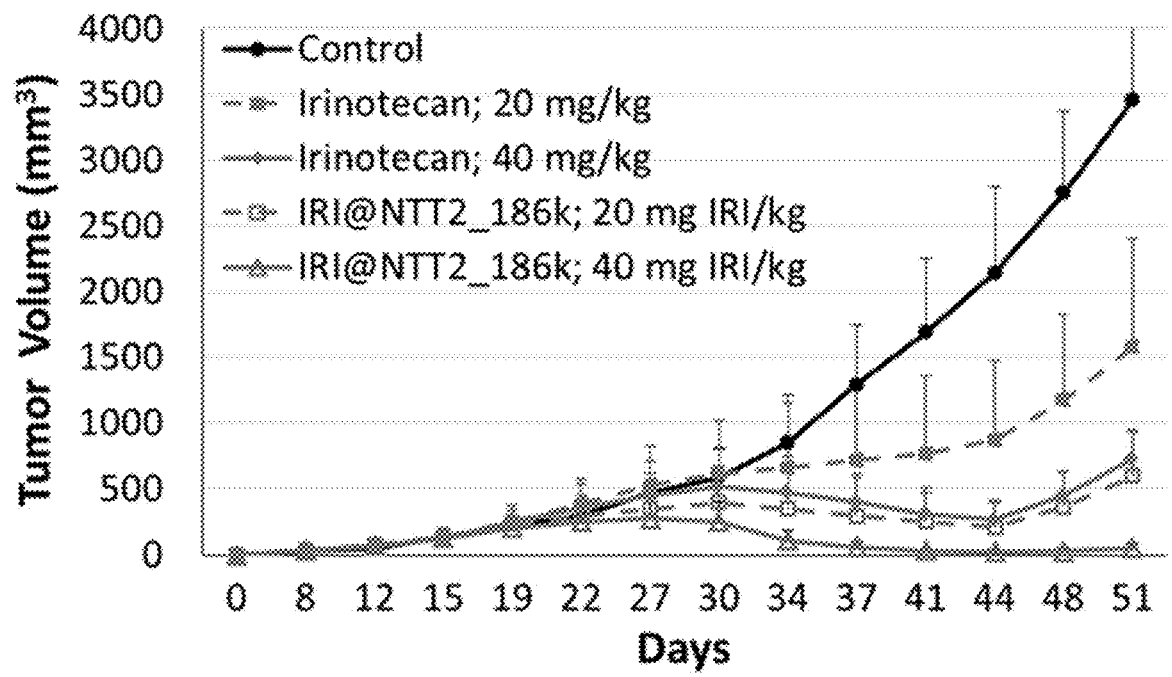

In order to evaluate the efficacy of IRI@$(SO_3^-)$-MSN (IRI@NTT2_186k) anti-colorectal tumor in vivo, $5\times10^6$ HCT-116 cells, human colorectal cancer cells, were implanted subcutaneously on left flank of NOD-SCID mice to serve as the HCT-116 heterotopic xenograft mouse model. Tumor-bearing mice received IRI and IRI@NTT2_186k at dose levels of 20 and 40 mg/kg twice per week for a total 6 administration. The tumor size and body weight were observed over the study period. Irinotecan in MSN nano-formulation exhibited higher effective tumor inhibition than irinotecan alone. Results indicated that IRI@NTT2_186k exhibited dose-related anti-cancer efficacy. In 40 mg/kg IRI@ NTT2_186k group, the tumor growth was significantly suppressed and no body weight loss observed during administration. After treatment, the tumor on the mice treated with 40 mg/kg IRI@MSN almost disappeared. Furthermore, IRI@NTT2_186k can achieve similar efficacy at two times lower doses than IRI alone (FIG. 3).

Example 6

Figure 4A:
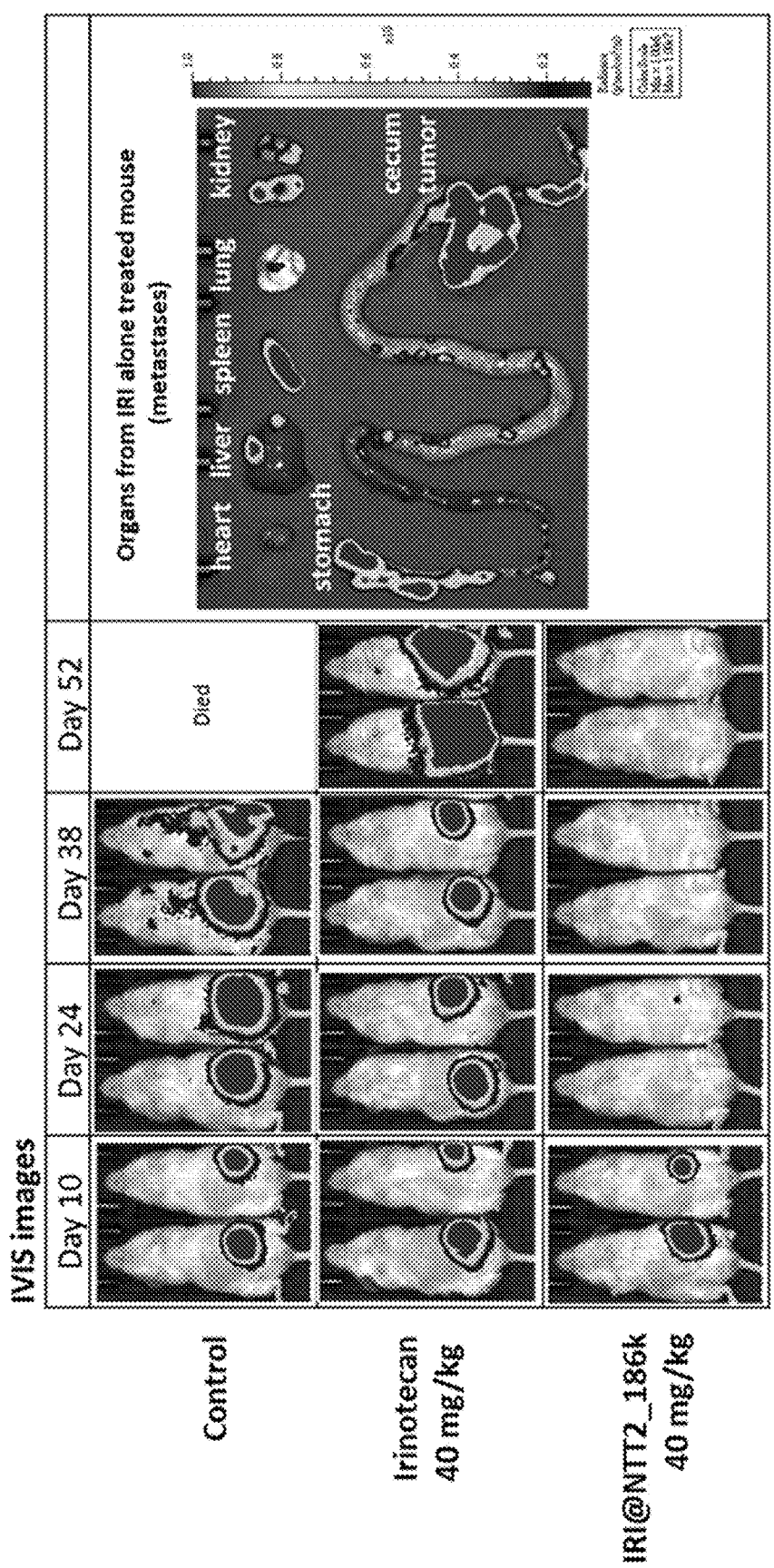
FIGS. 4A and 4B show the results of bioluminescence diagrams for evaluating the effect of inhibiting tumor growth and metastases of IRI@NTT2_186k in metastatic colorectal mouse model (FIG. 4A), and the results of quantitative bioluminescence intensity in tumor and overall survival (FIG. 4B).
Figure 4B:
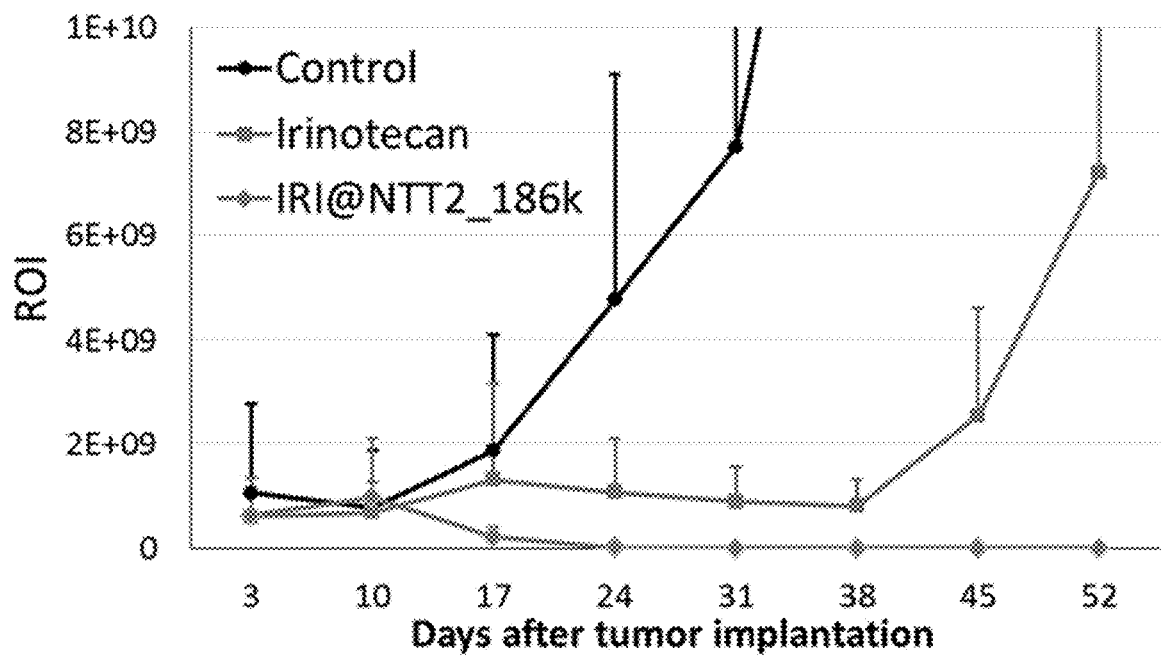
Figure 4B:
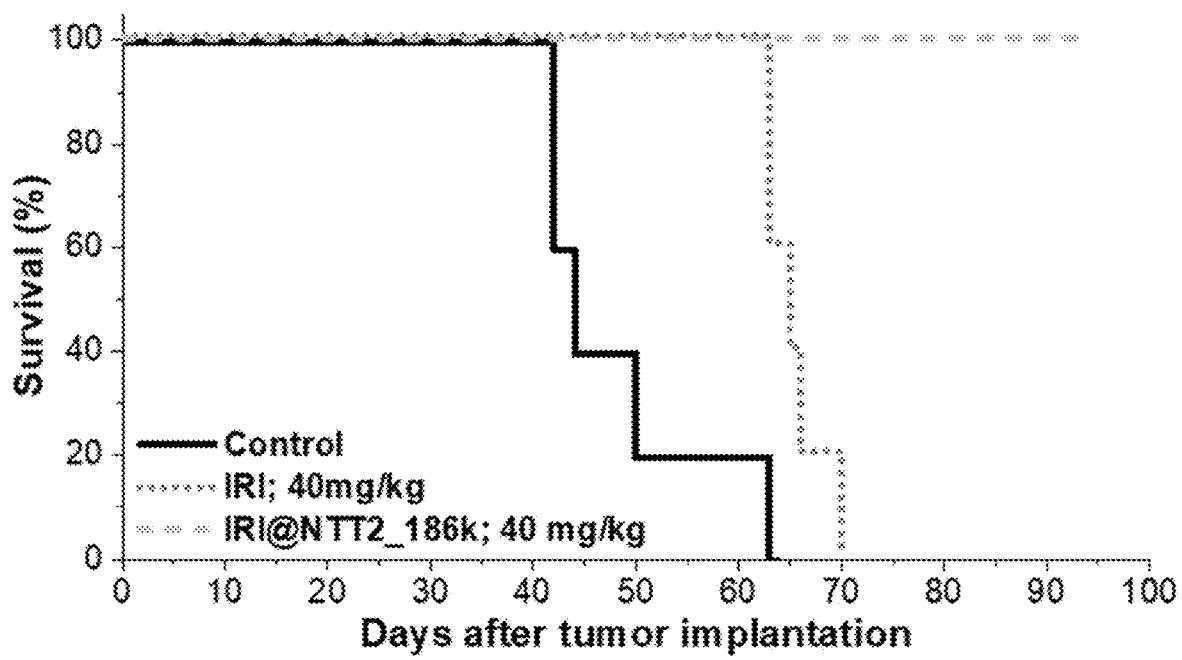

Irinotecan in MSN Nano-Formulation is Capable of Repressing Primary Tumor Growth and Metastasis and Prolonging the Survival Time of Mice Colorectal cancer is highly metastatic, and an effective therapy capable of repressing primary colorectal tumor growth and also metastasis is sorely needed. The orthotopic metastatic colorectal cancer model is a good model to test the effectiveness of therapeutics. $2\times10^6$ luciferase-expressing HCT-116 cells were directly injected into the wall of the cecum with surgery to establish the orthotopic colorectal cancer metastasis model, this model spontaneously produces highly metastatic tumors in adjacent intestinal tissues, peritoneum, and distance metastasis (spleen, kidney, liver, and diaphragm). Tumor-bearing mice received IRI and IRI@NTT2_186k at dose levels of 40 mg/kg twice per week for a total of 8 administrations. The tumor growth and metastasis were observed by the IVIS system once a week and body weight was observed over the study period. To assess overall survival, animals were monitored up to the point of spontaneous death or approaching moribund status. Results of IVIS images and quantitative bioluminescence intensity presented the fast tumor growth and noticeable peritoneal metastases in the control group, which facilitated the death of the mice. Mice treated with IRI alone exhibited a slower tumor growth rate compared to the control group, but IRI exhibited inefficient inhibition of tumor growth and metastases, therefore tumor relapse and tumor metastases were observed once the treatment was discontinued. IRI@NTT2_186k significantly inhibited primary tumor growth and cancer metastases, and the bioluminescence signal of cancer cells was undetectable after treatment. All mice survived until the end of the study, the survival time of the IRI@NTT2_186k treated group was much longer than the IRI treated group and control group (FIGS. 4A and 4B). Another metastasis mouse model was also used for the efficacy study. HCT-116-Luc cells tumor chunks (2~3 mm×2~3 mm chunks) were fastened to the cecum wall to serve as the orthotopic colorectal cancer metastasis model. Similar results were observed, IRI@NTT2_186k treated group exhibited significantly inhibited primary tumor growth and cancer metastases and prolonged survival. In conclusion, irinotecan in MSN nanoformulation could offer benefits over irinotecan, simultaneously inhibited primary tumor growth and cancer metastases and prolonged survival. Antineoplastic agents in MSN nanoformulation offered a potential treatment for highly metastatic cancers.

Example 7

Tube Formation Assay

Figure 5:
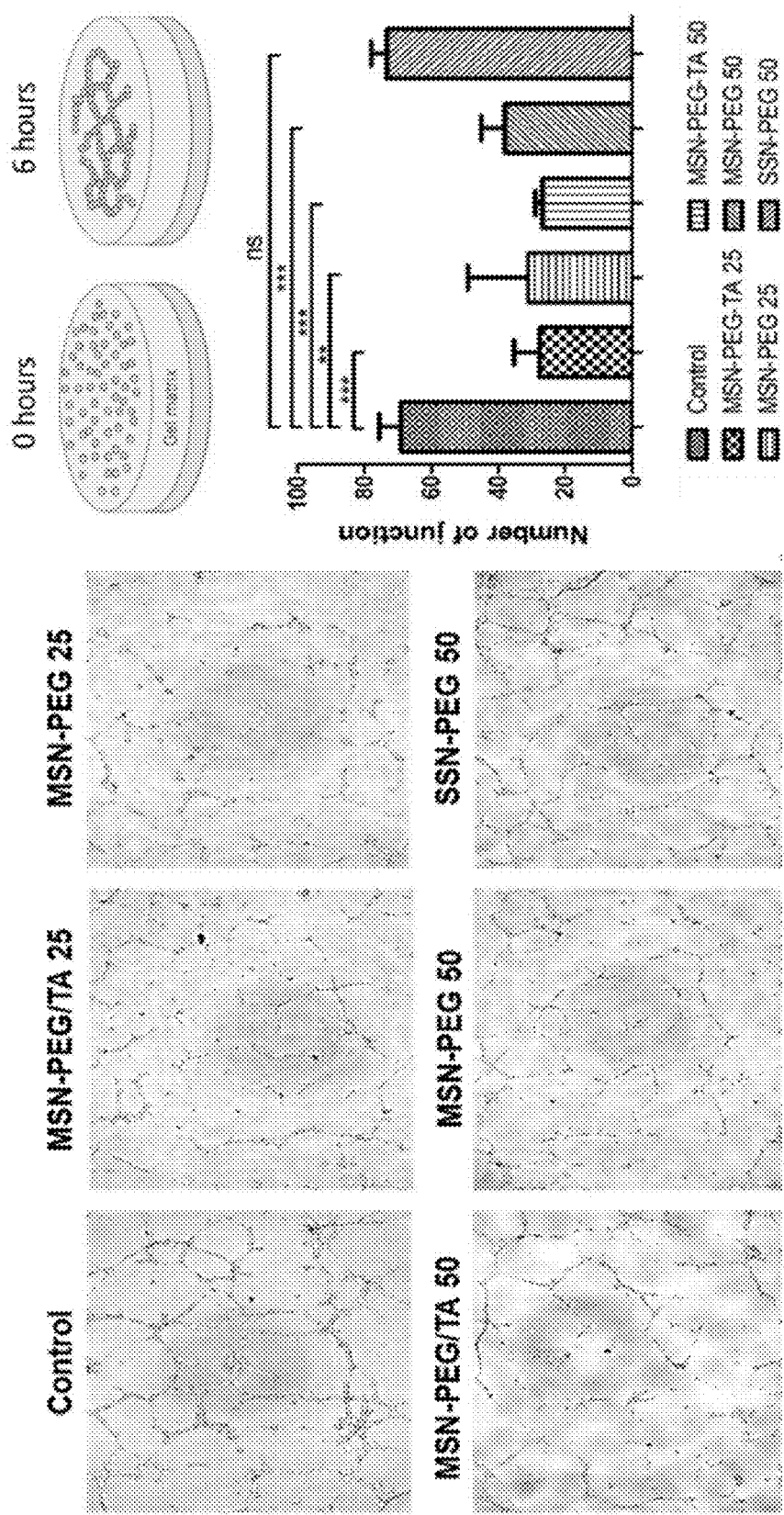
FIG. 5 shows the results of tube formation assay for evaluating the effect of MSN inhibiting tube formation.

Cancer cell migration and tumor angiogenesis were important factors for cancer metastasis. During the tumor angiogenesis process, the endothelial cells sprouted from the existing blood vessel and formed new blood vessels near tumor sites that supplied nutrients for tumor fast growth. Tube formation assay was used to investigate the effect of MSN on cell immigration and angiogenesis. Tube formation assay was established by seeding HUVEC cells on matrigel. After 6 hours, the formation of tubular structures was observed and the junctions of blood vessels were calculated using ImageJ. In the control group and SSN (solid silica nanoparticle) group, a complete network of tubular structures was exhibited. However, in the four MSN groups, the formation of tubular structures was inhibited. Results indicate that MSNs can inhibit the crawling of HUVEC and prevent the formation of tubular structures (FIG. 5).

Example 8

Chorioallantoic Membrane (CAM) Analysis for Angiogenesis

To evaluate the effect of MSNs on tumor angiogenesis, chicken embryo chorioallantoic membrane (CAM) tumor model was used. The fertilized eggs were incubated in the incubator for 10 days, then a small window was opened in the eggshell and the cancer cells were implanted on the CAM membrane near the aorta. MSN or Doxorubicin (DOX) was administered on day 12 when the tumor was formed and the angiogenesis near the tumor was observed on days 14 and 16.

Figure 6:
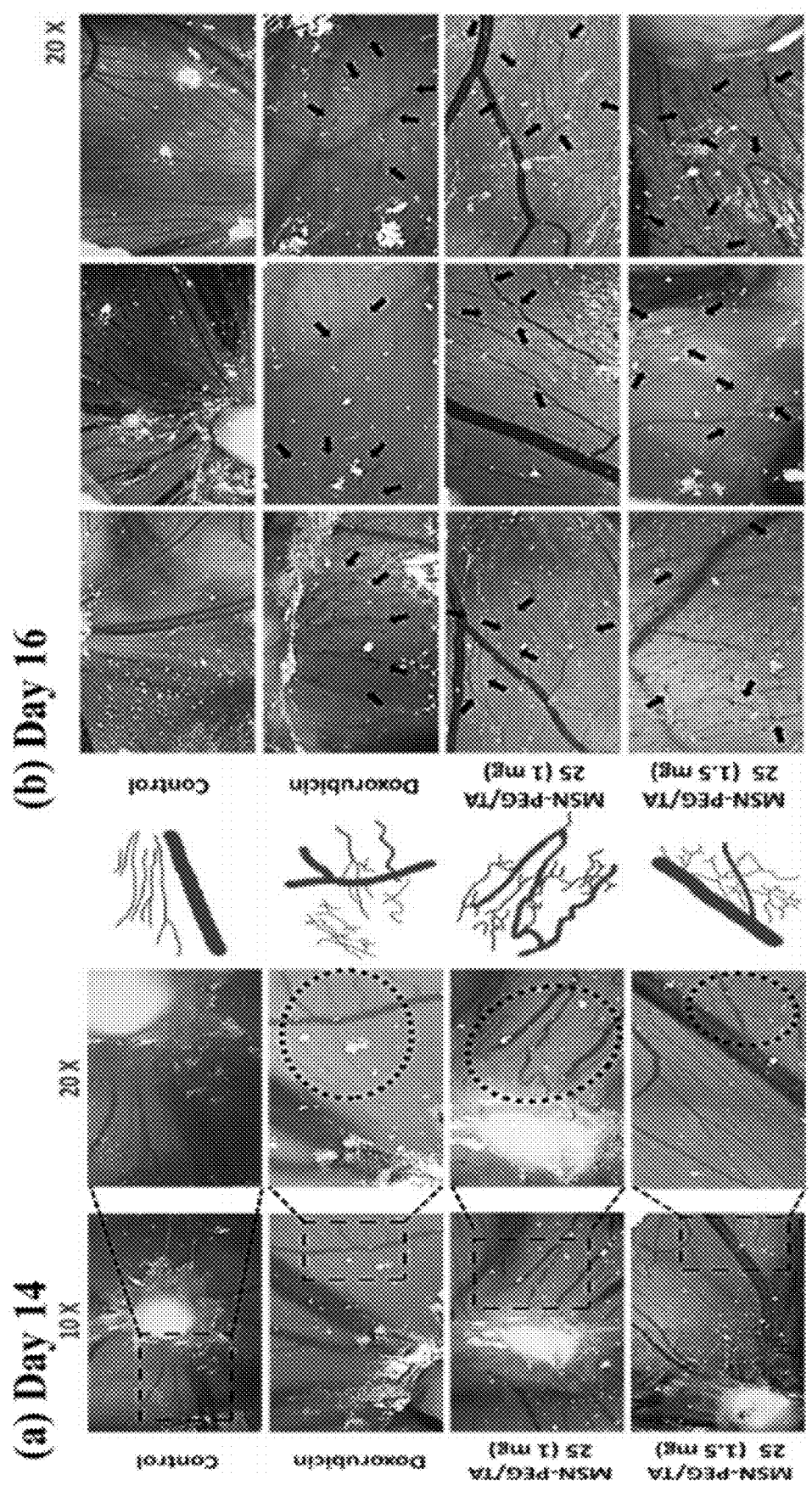
FIG. 6 shows the results of Chorioallantoic Membrane (CAM) analysis for evaluating the effect of MSN on angiogenesis.

In the DOX treated group, blood vessels exhibited disintegration and decreased density due to DOX inhibited the proliferation of blood vessels. Although MSN did not reduce the density of blood vessels like DOX, MSN caused irregular growth of blood vessels and prevented blood vessel formation in tumor regions in comparison to the blood vessels in the control group. In the MSN group, the number of branched microvessels increased, but the length became much shorter (FIG. 6). MSN inhibited the migration of endothelial cells and tumor cells, hence the tumor-induced proliferation of vascular endothelial cells could not spread outward and only accumulated in situ. In conclusion, in the MSN treated group, the density of blood vessels did not decrease, but the migration ability of endothelial cells was affected, resulting in irregular growth of blood vessels.

Example 9

MSNs Inhibit Metastasis and Enhance Overall Survival In Vivo Study (Co-Treatment of Lipo-Dox and MSN)

Figure 7:
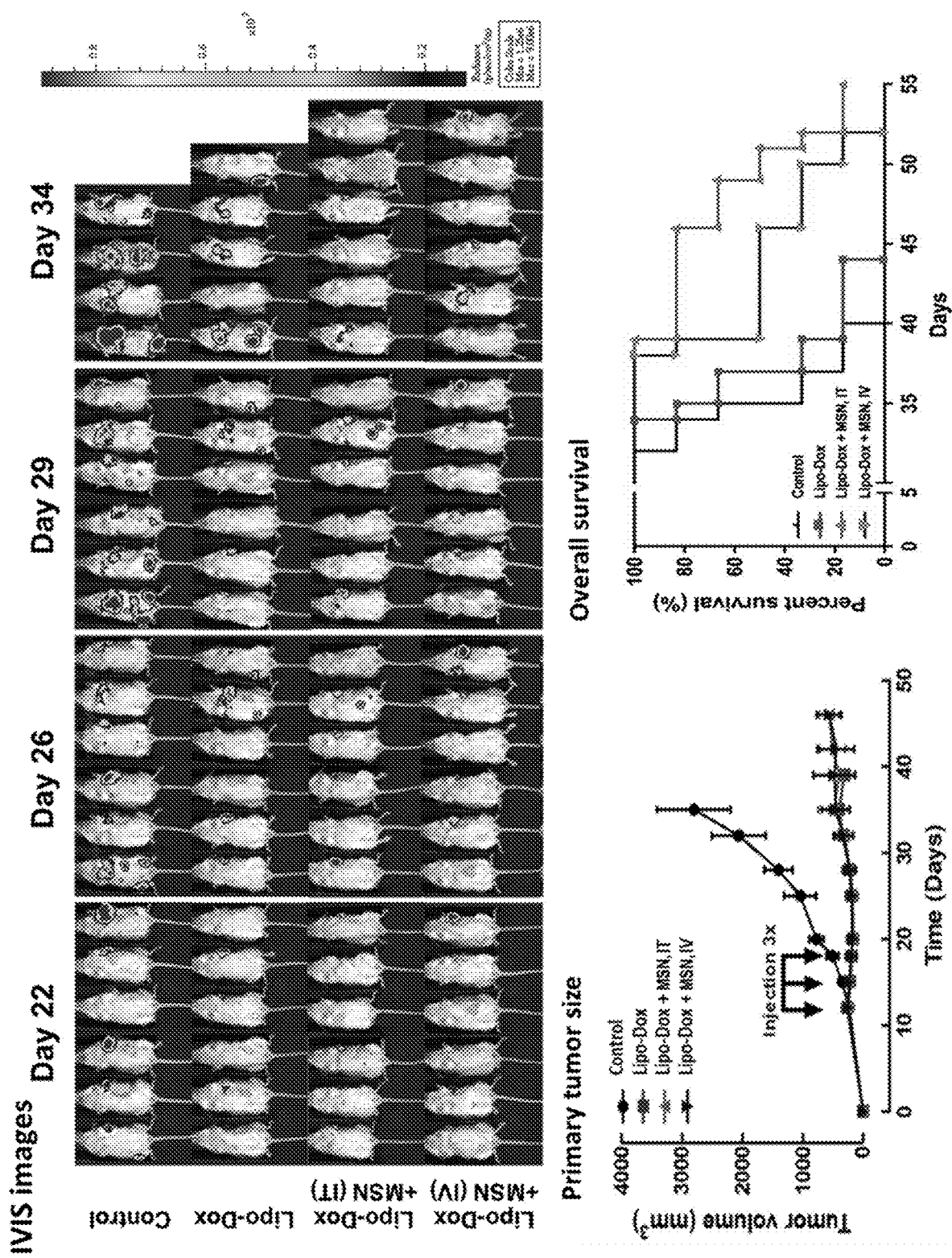
FIG. 7 shows the anti-metastases and overall survival enhancement of MSN (co-treatment of MSN and an anti-neoplastic agent).

The spontaneous cancer metastasis mouse model was used to evaluate the effect of metastases inhibition of MSNs on survival time. $1.5 \times 10^6$ luciferase-expressing 4T1 cancer cells were implanted subcutaneously on the left flank of BALB/c mice to serve as the heterotopic allograft mouse model. Tumor-bearing mice received Lipo-Dox (IV injection, 4 mg/kg) combined with/without MSN (IV or IT injection) for a total of 3 administrations in 3 days intervals. Tumor growth and overall survival were monitored after tumor injection. For tracking the cancer metastasis, bioluminescence diagrams were taken by the IVIS system on days 22, 26, 29, and 34. Mice in the control group were observed that the primary tumor grew rapidly and cancer cells metastasized to other parts of the body. In Lipo-Dox treated group, the growth of primary tumor was inhibited but cancer metastases were still observed. The severe metastases of control group and Lipo-Dox treated group caused death of mice, resulting in both groups had similar survival time. In contrast, co-treatment with Lipo-Dox and MSN (MSN was injected via intravenous or intratumoral injection) significantly inhibits the metastases and extended survival time (FIG. 7). Results indicated that MSN noticeably inhibited cancer metastases but did not affect body weight and primary tumor size. Metastasis was a major factor causing death, antineoplastic agents (chemotherapeutic agents, protein, nucleic drugs) in MSN nanoformulation or co-treatment with antineoplastic agents and MSN could simultaneously suppress the primary tumor growth and cancer metastasis and prolong the survival time. MSN could offer additional clinical benefits, lessen the incidences of metastasis, especially for cancers with high propensity of undergoing metastasis.

Example 10 Mechanisms of Metastasis Inhibition

Figure 8A:
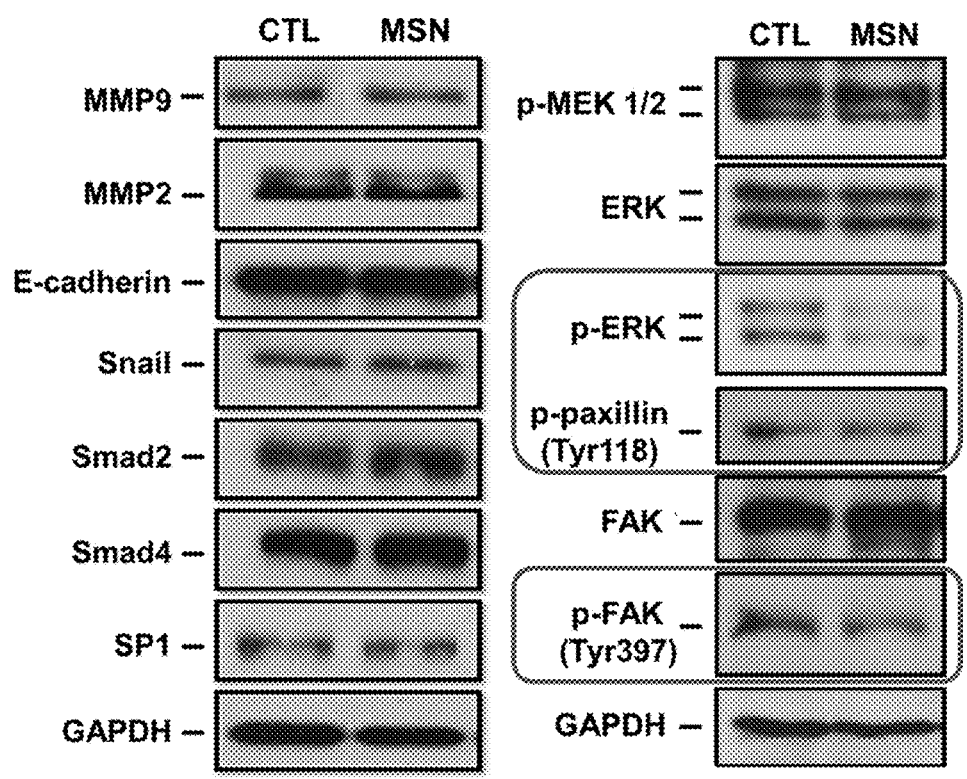
FIGS. 8A and 8B show the protein expression (FIG. 8A) and protein markers (FIG. 8B) related to metastases inhibition of MSN.
Figure 8B:
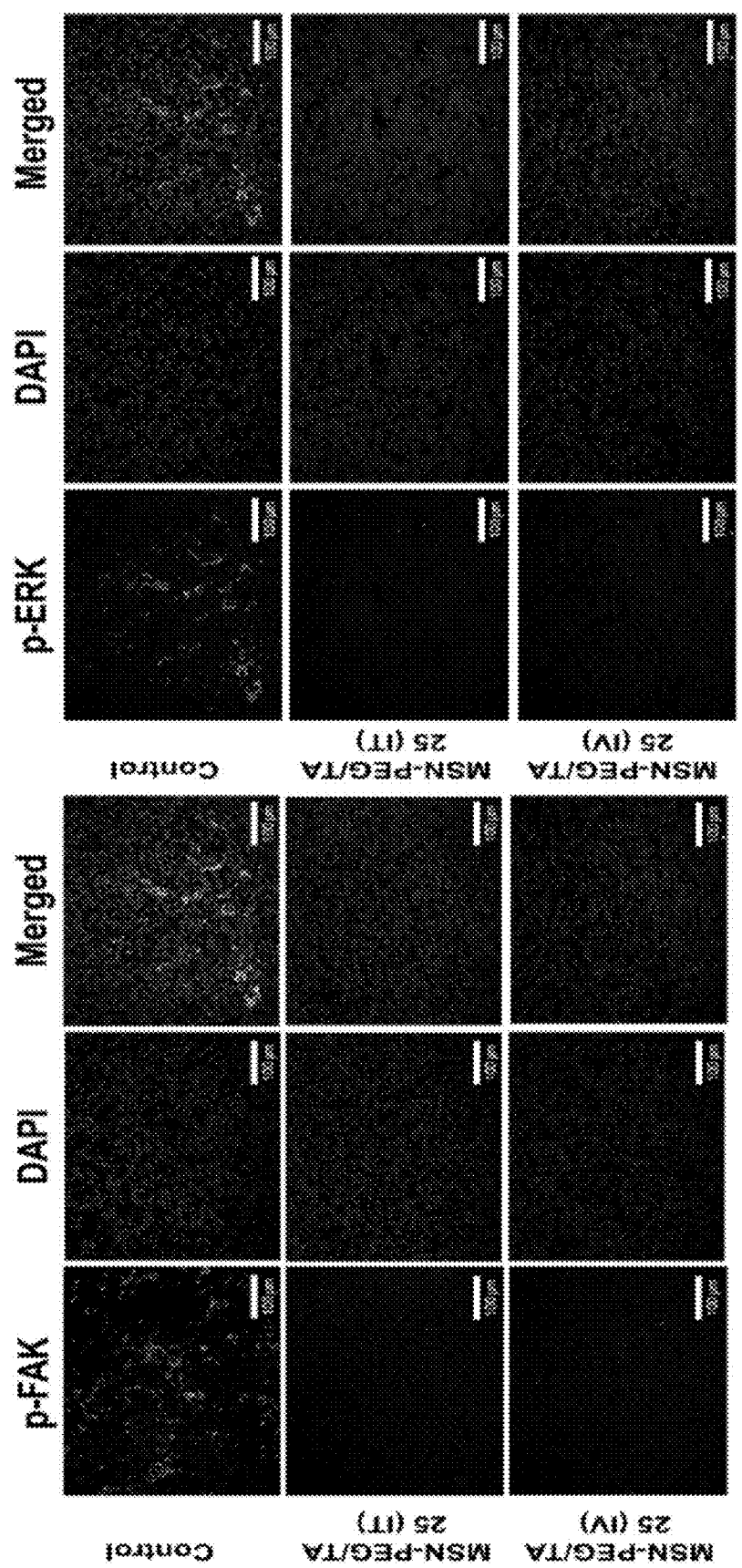

To investigate the mechanisms of MSN inhibit cell migration, angiogenesis, and cancer metastases, the protein expression level of cancer cells (4T1) treated with MSN was evaluated by western blot. According to results of western blot, the protein expression level of p-ERK, p-paxillin, and p-FAK in the cells treated with MSN-PEG/TA 25 were lower than control group, which indicated that MSN inhibited phosphorylation of ERK, Paxillin, and FAK (FIG. 8A). Phosphorylation of these proteins (ERK, Paxillin, and FAK)

has been shown to be associated with focal adhesion turnover that is related to cell migration. Results indicated that MSN could interrupt the balance of focal adhesion turnover resulting in inhibition of cell migration, angiogenesis, and cancer metastases. Furthermore, the tumor-bearing mice treated with MSN in the anti-metastasis in vivo study were sacrificed and the tumors were collected and sectioned for immunohistochemistry stain. The green signal from p-FAK and p-EPR in the tumor (from MSN treated mice) was significantly lowered than control group (FIG. 8B). Results of analyzing the protein expression in cells and immunofluorescence of protein markers in the tumor, which demonstrated that the mechanism of MSN inhibited metastases was related to interruption of the balance of focal adhesion turnover.

Another mechanism of nanoparticles limited cell motility was proposed in the literature, which was nanoparticle-mediated massive disruption of the intracellular microtubule assembly. To evaluate the effect of MSN on cytoskeleton of cells, the protein expression related to cytoskeleton (G-actin and F-actin) and changes of the cytoskeleton morphology (F-actin and α-tubulin) of MSN-treated cells were detected by western blot and immunofluorescence assay. Data of western blot and immunofluorescence assay exhibited no difference between the MSN treated group and control group; resulting in MSNs did not affect the actin and microtubule cytoskeleton. The metastasis inhibition of MSN was related to interruption of the balance of focal adhesion turnover rather than the interference of intracellular microtubule cytoskeleton.

The ingredients, reaction conditions and parameters illustrated in the examples are merely for illustrative purposes and not intended to limit the material or the preparation method.

A person of ordinary skill in the art of the subject invention should understand that variations and modification may be made to the teaching and the disclosure of the subject invention without departing from the spirit and scope of the subject application. Based on the contents above, the subject application intends to cover any variations and modification thereof with the proviso that the variations or modifications fall within the scope as defined in the appended claims or their equivalents.

What is claimed is:

1. A method for treating a cancer in a subject and/or treating a subject who has or is at risk for metastasis of the cancer comprising administering to the subject irinotecan (IRI) loaded in a mesoporous silica nanoparticle (MSN) and optionally a pharmaceutically acceptable carrier; wherein the MSN defines at least one pore and has at least one functional group on a sidewall of the at least one pore, wherein a pKa value of the at least one functional group is less than or equal to 4.5, wherein the IRI is loaded in the at least one pore in a lactone form; and wherein an average hydrodynamic diameter of the MSN is less than 80 nm measured in PBS medium.

2. The method according to claim 1, wherein the cancer is a squamous cell cancer, a lung cancer, a cancer of the peritoneum, a hepatocellular cancer, a gastric or stomach cancer including gastrointestinal cancer, a pancreatic cancer, a glioblastoma, a cervical cancer, an ovarian cancer, a liver cancer, a bladder cancer, a cancer of the urinary tract, a hepatoma, a breast cancer, a colon cancer, a rectal cancer, a colorectal cancer, an endometrial or uterine carcinoma, a salivary gland carcinoma, a kidney or a renal cancer, a prostate cancer, an vulval cancer, a thyroid cancer, a hepatic carcinoma, an anal carcinoma, a penile carcinoma, a melanoma, a multiple myeloma, B-cell lymphoma, a brain cancer, or a head and neck cancer.

3. The method according to claim 1, wherein the MSN is capable of inhibiting angiogenesis, inhibiting tube formation, inhibiting focal adhesion turnover and/or inhibit cell migration of a cell of the cancer.

4. The method according to claim 1, wherein the at least one functional group comprises a sulfonate, organosulfate, carboxylate, phosphonate, phosphinate, organophosphate, or organophosphite group.

5. The method according to claim 1, wherein the MSN is synthesized from a silane and a pore sidewall functioning silane having the at least one functional group, and wherein a molar ratio of the amount of silane to that of silane with the functional group ranges from 60:1 to 5:1.

6. The method according to claim 1, which further comprises an outer surface modification with an organic molecule, oligomer or polymer and/or a positively charged molecule, oligomer or polymer.

7. The method according to claim 6, wherein the organic molecule, oligomer or polymer is selected from poly(ethylene glycol) (PEG), poly(propylene glycol) (PPG), or PEG-PPG copolymers, or combinations thereof.

8. The method according to claim 6, wherein the positively charged molecule, oligomer or polymer is selected from (N-[3-(trimethoxysilyl) propyl]-N,N,N-trimethylammonium chloride), N-[3-(Trimethoxysilyl) propyl] ethylenediamine, polyethylenimine (PEI); alkoxylsilane-terminated (poly)alkylene(poly)amine, or organo-alkoxysilane with amino group(s), or combinations thereof.

9. The method according to claim 1, wherein the functional group comprises a sulfonate, an organosulfate or both.

10. The method according to claim 1, wherein the cancer is a pancreatic cancer, a breast cancer, a lung cancer, a hepatic carcinoma, a gastric cancer, a cervical cancer, an ovarian cancer, a colon cancer, a rectal cancer or a colorectal cancer.

11. The method according to claim 1, wherein the cancer is a pancreatic cancer, a breast cancer, a colon cancer, a rectal cancer or a colorectal cancer.

12. A method for treating a cancer or inhibiting metastasis of the cancer in a subject, comprising administering to the subject irinotecan (IRI) loaded in a mesoporous silica nanoparticle (MSN) and optionally a pharmaceutically acceptable carrier; wherein:
 the MSN defines at least one pore and has at least one sulfonate or organosulfate group on a sidewall of the at least one pore;
 the sulfonate and the organosulfate group have a pKa value of less than or equal to 4.5;
 the IRI is loaded in the lactone form in the at least one pore;
 an average hydrodynamic diameter of the MSN is less than 80 nm measured in PBS medium; and
 the cancer is a pancreatic cancer, a breast cancer, a colon cancer, a rectal cancer or a colorectal cancer.

13. The method according to claim 12, wherein the MSN is capable of inhibiting angiogenesis, inhibiting tube formation, inhibiting focal adhesion turnover and/or inhibiting cell migration of a cell of the cancer.

14. The method according to claim 12, which further comprises an outer surface modification with an organic molecule, oligomer or polymer and/or a positively charged molecule, oligomer or polymer.

15. The method according to claim 14, wherein the organic molecule, oligomer or polymer is selected from the group consisting of poly(ethylene glycol) (PEG), poly(propylene glycol) (PPG), or PEG-PPG copolymers, and a combination thereof.

16. The method according to claim 14, wherein the positively charged molecule, oligomer or polymer is selected from the group consisting of (N-[3-(trimethoxysilyl) propyl]-N,N,N-trimethylammonium chloride), N-[3-(Trimethoxysilyl) propyl]ethylenediamine, polyethylenimine (PEI); alkoxylsilane-terminated (poly)alkylene(poly)amine, or organo-alkoxysilane with amino group(s), and a combination thereof.

* * * * *